United States Patent [19]

Smith, Jr.

[11] 4,293,921
[45] Oct. 6, 1981

[54] METHOD AND SIGNAL PROCESSOR FOR FREQUENCY ANALYSIS OF TIME DOMAIN SIGNALS

[75] Inventor: Winthrop W. Smith, Jr., Maitland, Fla.

[73] Assignee: Martin Marietta Corporation, Bethesda, Md.

[21] Appl. No.: 48,810

[22] Filed: Jun. 15, 1979

[51] Int. Cl.³ .......................................... G06F 15/332
[52] U.S. Cl. .................................................. 364/726
[58] Field of Search ....................................... 364/726

[56] References Cited

U.S. PATENT DOCUMENTS 3,783,258  1/1974  Chwastyk ........................... 364/726
3,920,978  11/1975  Schmitt et al. ...................... 364/726

Primary Examiner—David H. Malzahn
Attorney, Agent, or Firm—Burns, Doane, Swecker & Mathis

[57] ABSTRACT

A signal processor and method for processing N discrete samples of a quantized time domain signal to determine the frequency content or frequency spectrum of the time domain signal. Real and imaginary components of the quantized signal are processed in accordance with a decomposition technique that eliminates considerable hardware and reduces processing time. In a multiple stage processor, interstage multipliers are eliminated. One such disclosed processor includes a first data memory stage for storing the discrete samples of the quantized time domain signal and for retrieving the stored samples in a predetermined order in which component positions are circularly rotated by a predetermined number of positions from the order of storage thereof. An L-point computational stage receives the retrieved samples of the quantized time domain signal and calculates real and imaginary output signals representing the solution to an L-point discrete Fourier transform. A second data memory stage stores the real and imaginary output signals from said L-point computational stage. An M point computational stage, where N=LM and L and M are relatively prime numbers, receives the retrieved output signals and calculates real and imaginary output signals representing the solution to an LM point discrete Fourier transform.

54 Claims, 25 Drawing Figures

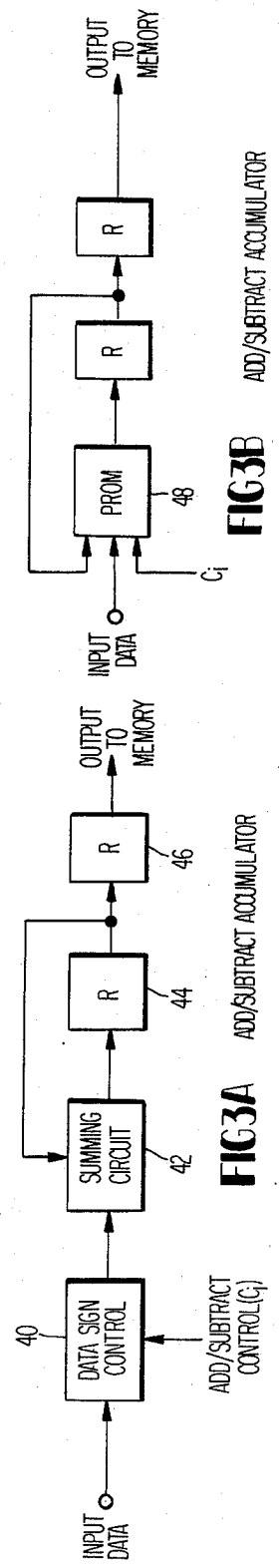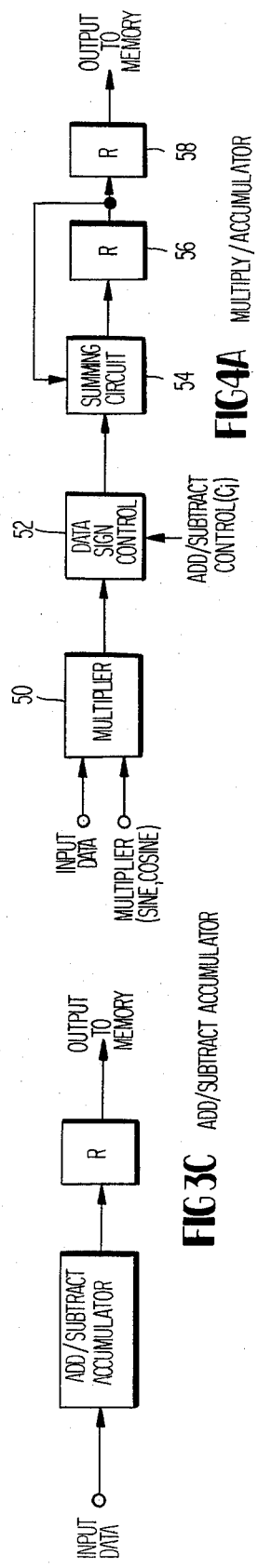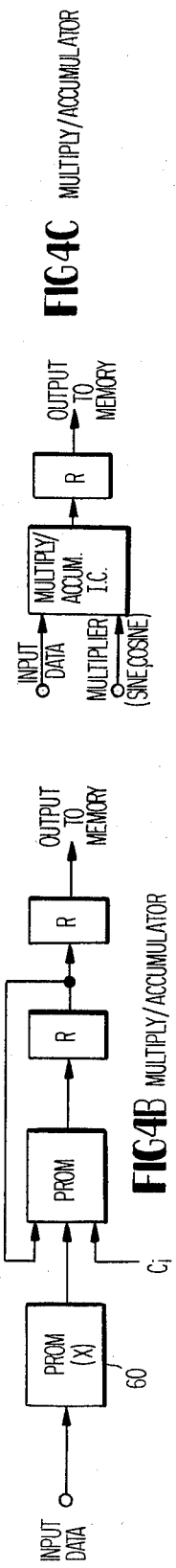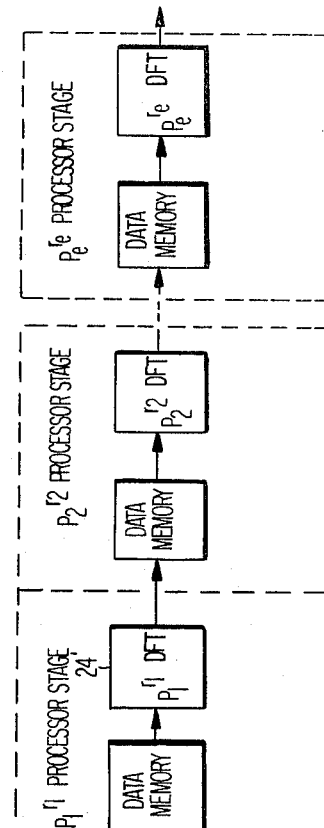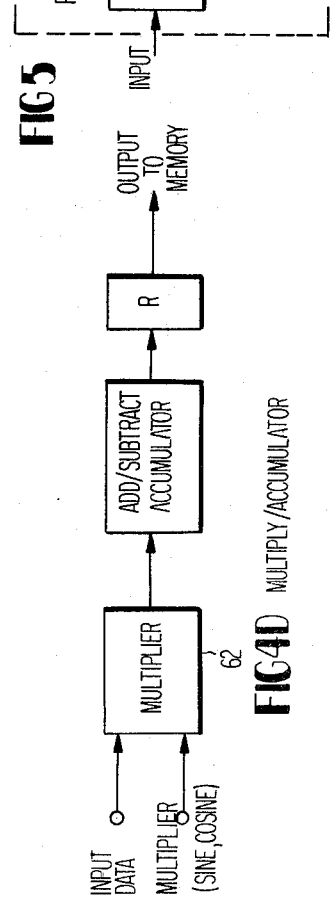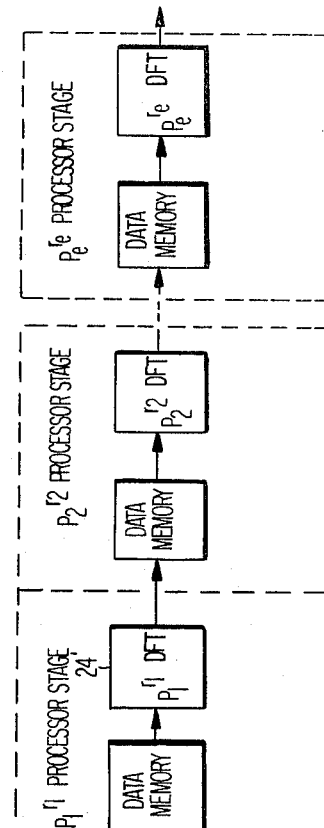

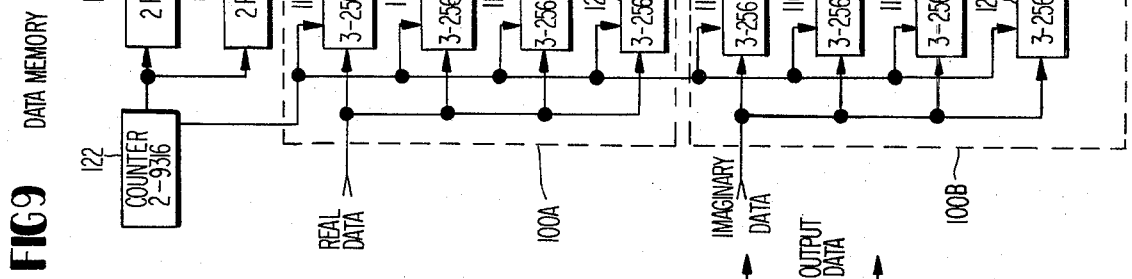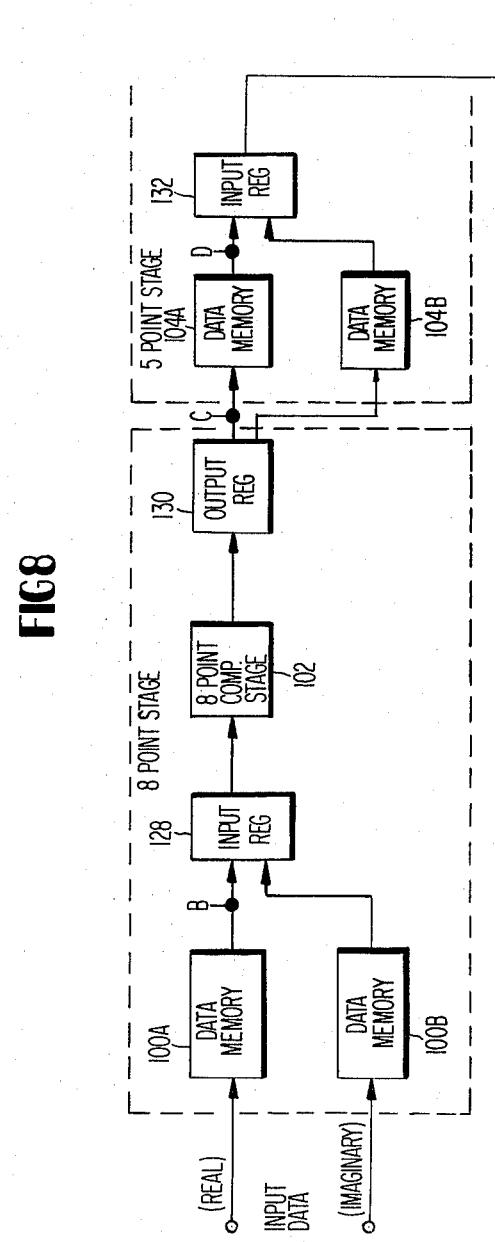

FIG.10A INPUT REGISTER
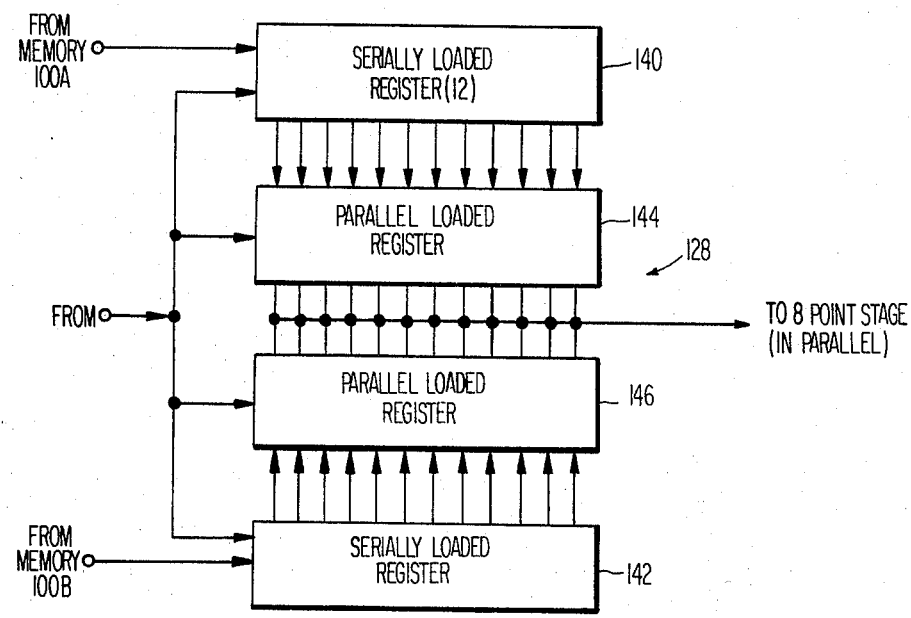
FIG.10B OUTPUT REGISTER
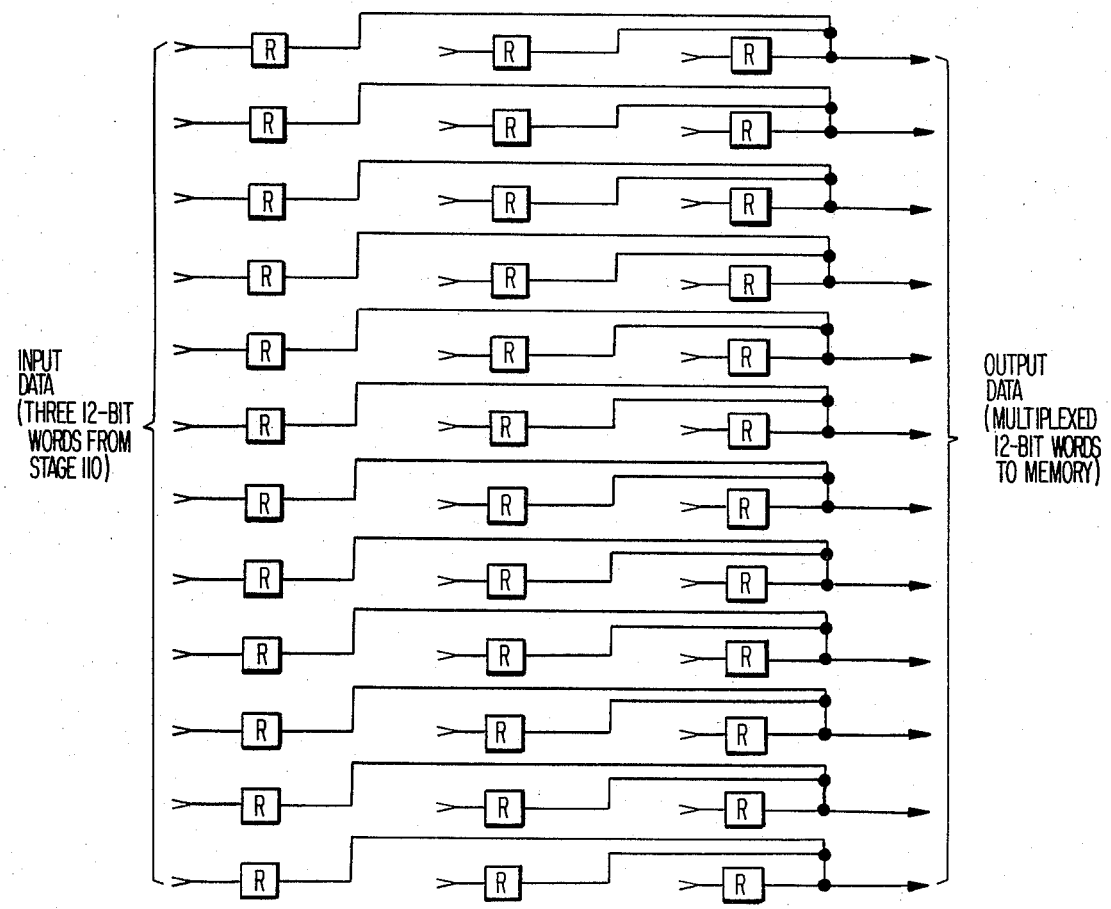

FIG 11A  THREE POINT STAGE FLOW GRAPH
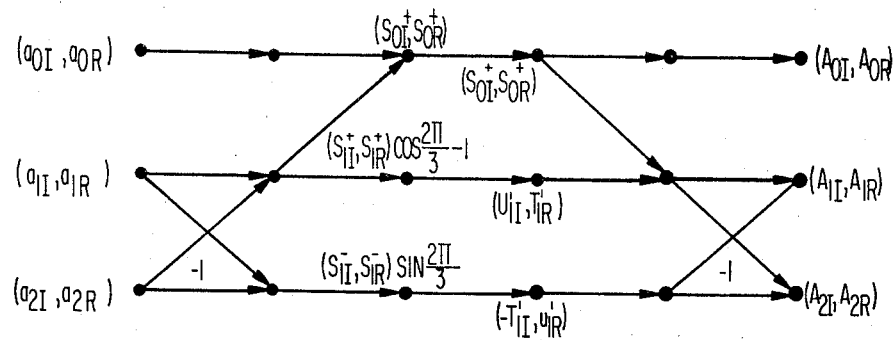
FIG 11B  FIVE POINT STAGE FLOW GRAPH
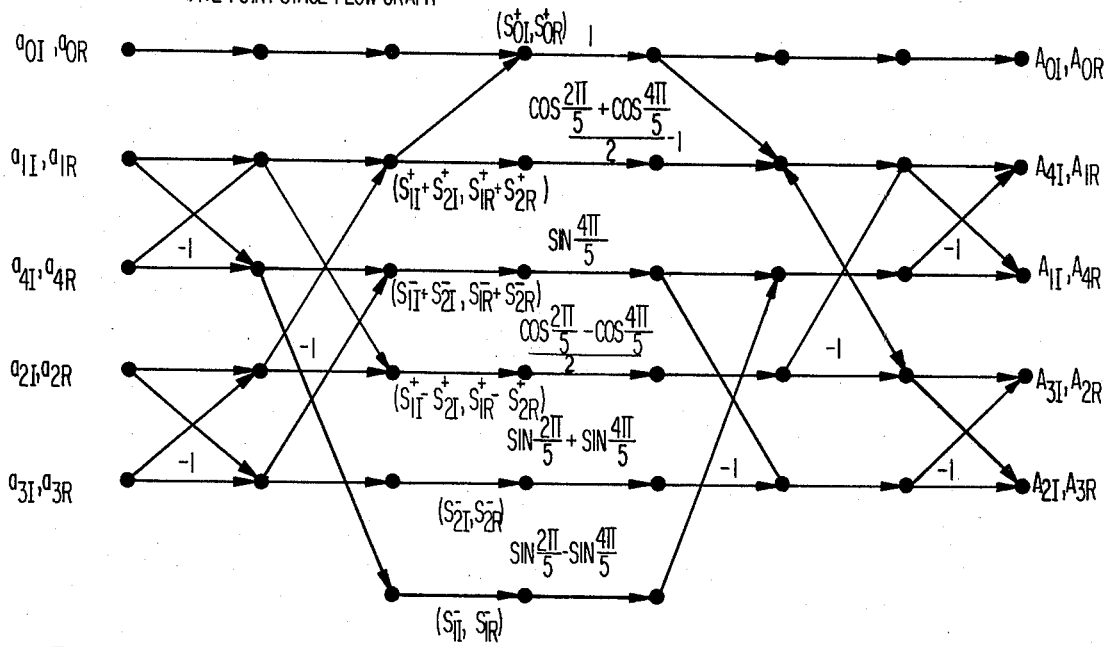
FIG 11C  THE EIGHT POINT STAGE FLOW GRAPH
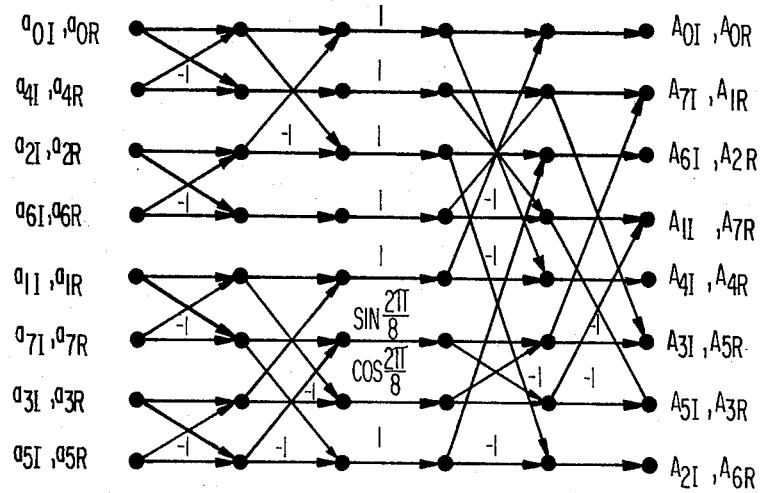

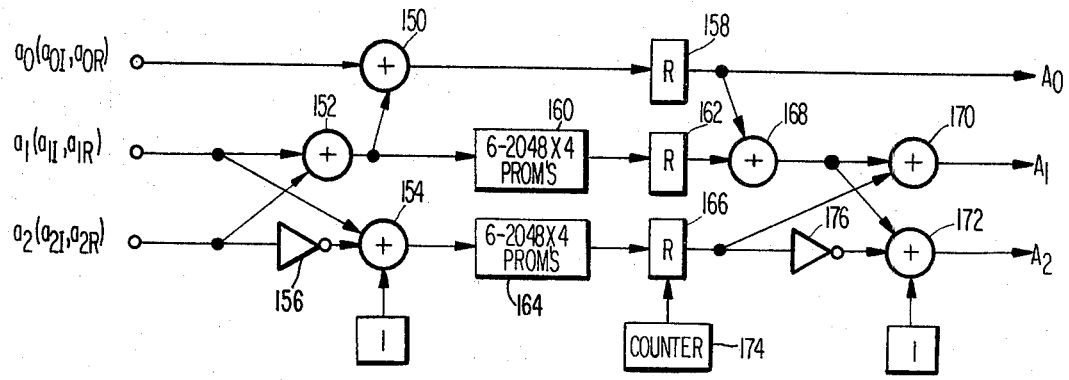
FIG 12A THREE POINT STAGE SCHEMATIC
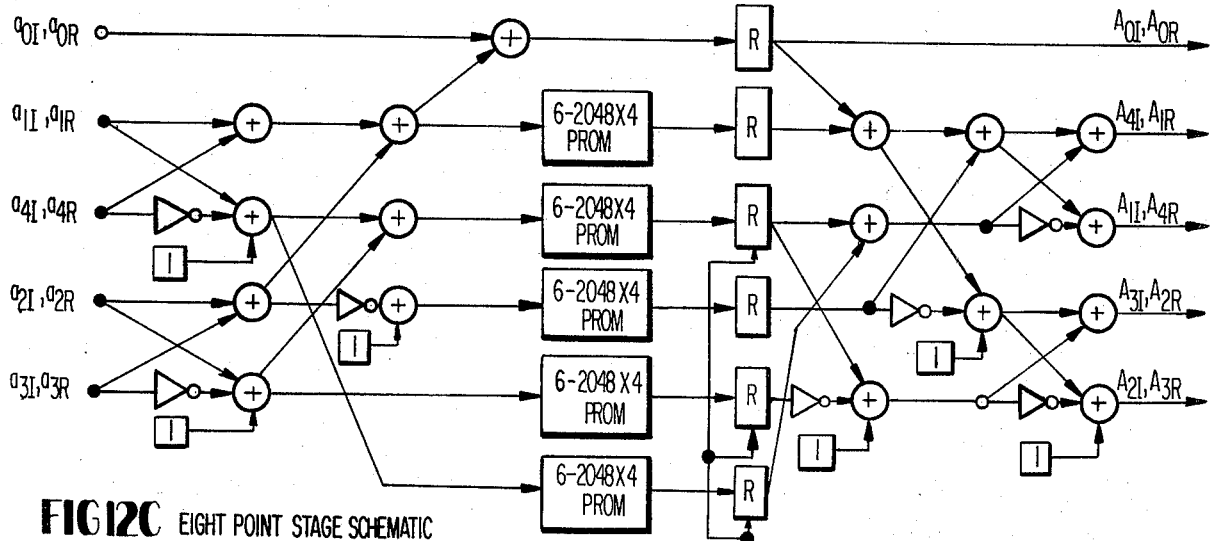
FIG 12B FIVE POINT STAGE SCHEMATIC
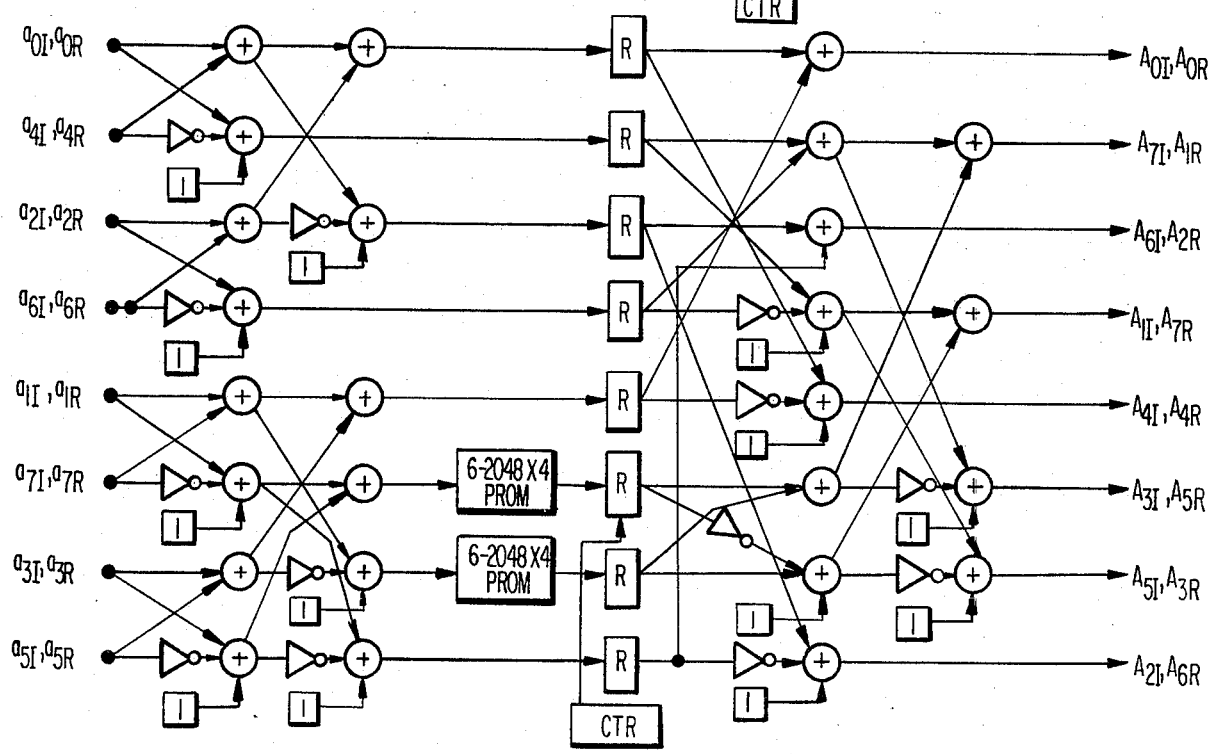
FIG 12C EIGHT POINT STAGE SCHEMATIC

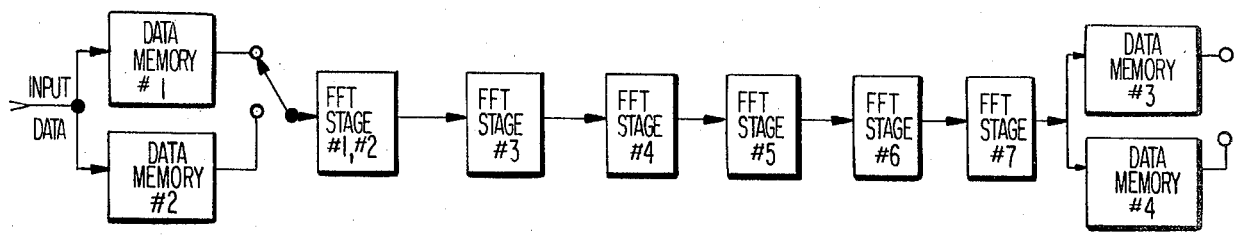
FIG 13A PRIOR ART    128 POINT FFT MECHANIZATION
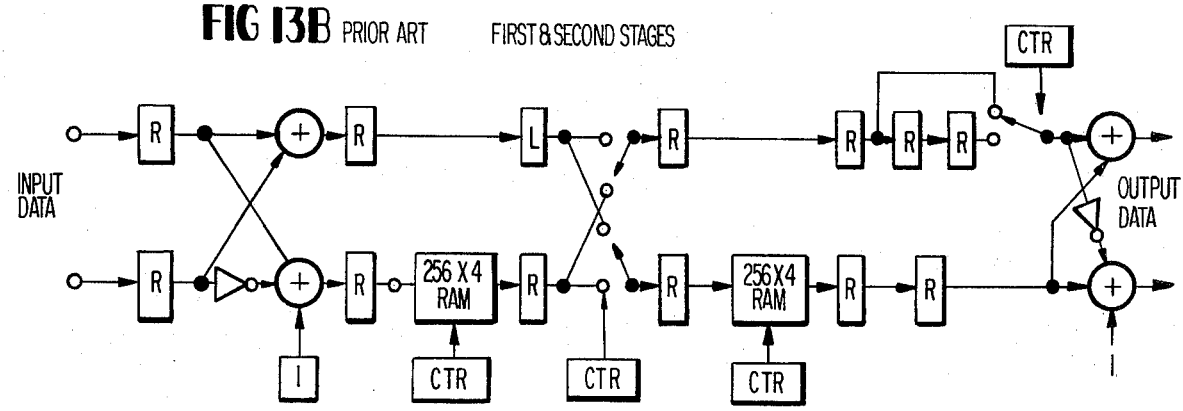
FIG 13B PRIOR ART    FIRST & SECOND STAGES
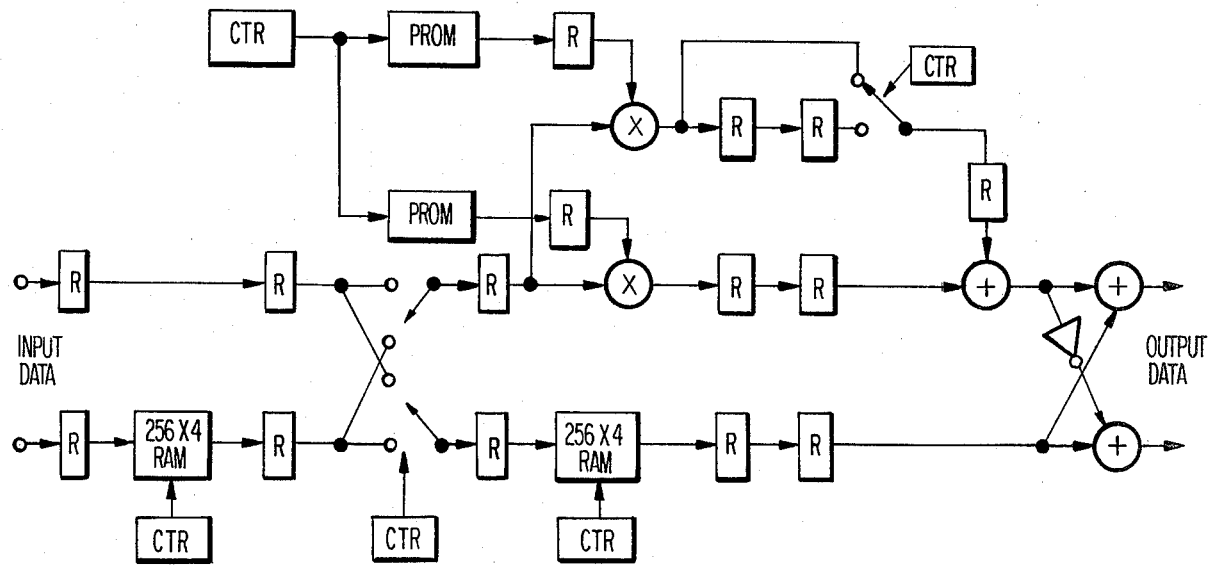
FIG 13C PRIOR ART    SUBSEQUENT STAGES

METHOD AND SIGNAL PROCESSOR FOR FREQUENCY ANALYSIS OF TIME DOMAIN SIGNALS

BACKGROUND OF THE INVENTION

The present invention relates to signal analyzers and, more particularly, to a novel signal processing method and system that analyzes the frequency (spectral) characteristics of a signal in electrical form through a technique that uses the Multidimensional Discrete Fourier Transform (MDFT) in conjunction with the internal structural properties of the Discrete Fourier Transform (DFT).

The frequency (spectral) content of a signal is an important parameter in numerous applications such as radar and sonar signal processing, speech analysis and synthesis, meteorological measurements, vibration analysis, and so forth. In a Doppler radar system, for example, the echo or return signal contains various frequency components. These frequency components are typically analyzed by "Fourier analysis" techniques to provide information as to the existence of moving and stationary objects and characteristics such as the speed of the objects.

Fourier analysis essentially breaks the signal down into various frequency components so that a complex signal can be represented by a series of simple or fundamental frequencies. The simple frequencies can then be used to reconstruct the events that are causing or generating the complex frequency spectrum of the signal under consideration.

A continuous signal can be decomposed into sets of sinusoidal functions by the Fourier Transform:

$$G(\omega) = \int_{-\infty}^{+\infty} f(t)e^{-j\omega t}dt$$

in which $G(\mu)$ is called the frequency spectrum of the signal $f(t)$. The Fourier Transform, therefore, transforms a signal from the time domain in which the signal is expressed as a function of time into the frequency domain in which the signal is expressed as a function of frequency.

Frequency analysis techniques have advanced over the years from mere separation of frequencies by analog filtering to present day techniques involving digital analysis. For digital analysis, the signal to be processed is quantitized by a suitable sampling or other digitizing process.

When the continuous signal is digitized, the Fourier Transform cannot be used to represent the frequency spectrum of the digitized signal due to the discrete nature of the digitized signal. However, a discrete approximation derived from the Fourier Transform can be used to transform digitized signals from the time domain into the frequency domain. This discrete approximation is referred to as the Discrete Fourier Transform (DFT).

A digitized signal can be decomposed into sets of sinusoidal functions by the Discrete Fourier Transform, the k-th term of which is:

$$A_k = \sum_{n=0}^{N-1} a_n e^{-j\frac{2\pi}{N}kn}$$

where N represents the total number of digitized samples taken of the continuous time domain signal f(t); n represents the numbering of the digitized samples of the signal f(t); and $a_n$ represents the digitized samples of the signal f(t). This Discrete Fourier Transform is termed an N-point transform since N digitized samples are transformed from the time domain into the frequency domain.

The larger the total number of digitized samples taken of the continuous signal, the closer the digitized time domain signal represents the continuous time domain signal, and the closer the Discrete Fourier Transform of the digitized signal approaches the Fourier Transform of the continuous time domain signal. Therefore, the digital samples may number in the hundreds or even thousands in systems requiring high precision. Consequently, numerous additions, subtractions and multiplications must be performed by a digital processor in order to obtain digital numbers which are indicative of the frequency spectrum of the continuous time domain signal.

A single multiplication typically takes much more time to perform than a single addition or subtraction. Moreover, each multiplication in the DFT generally involves multiplying complex numbers, i.e., numbers containing both a real and an imaginary component. Such complex multiplication further increases the time, and the hardware, required to carry out each multiplication. Thus, the speed at which a particular processor processes data is determined in large part by the number of multiplications the particular processor must perform.

The total amount of hardware required to perform the numerous additions, subtractions and multiplications in an N-point DFT processor can be reduced by cascading an $L_1$-point DFT processor stage and an $L_2$-point DFT processor stage where $N=L_1 \cdot L_2$. In general, a phase shifter or "twiddle factor" multiplier is required between each stage. But if $L_1$ and $L_2$ are mutually prime numbers (i.e., if $L_1$ and $L_2$ do not contain any common factors), then an interstage twiddle factor multiplier is not required. What is required, however, are data rotators which suitably reorder the data before the data enters each stage. Thus one type of hardware is traded for another.

It is known that the total amount of hardware required to perform the numerous additions, subtractions and multiplications in an N-point DFT processor stage can also be reduced by requiring the number of data points processed by the stage to be a power of two and then using what is referred to as a Fast Fourier Transform (FFT) technique to calculate the DFT. Thus constrained, $N=2^a$ where a is an integer.

The total amount of hardware required to perform the numerous additions, subtractions and multiplications in an N-point DFT processor stage has also been reduced by requiring N to be the product of certain small prime numbers. Using group theoretic properties of numbers, Shmuel Winograd recently discovered that the computation of an N-point DFT can be converted into a cyclic convolution when the integer N has certain properties. (Winograd, "A New Method For Computing DFT," 1977 IEEE International Convention on Acoustics, Speech and Signal Processing, pp. 366–68).

Using Winograd's discovery and the Chinese Remainder Theorem For Polynomials, it is possible to reduce the number of multipliers required to compute an N-point DFT when N is the product of samll prime numbers. When N is the product of certain small prime numbers, the number of multipliers can be reduced still further.

As in the FFT approach the Winograd Discrete Fourier Transform (WDFT) approach requires multipliers within each processor stage. In general, these intrastage multipliers are complex. However, using the WDFT approach certain small prime numbers are found to exist for which the intrastage multipliers are either real or imaginary but never complex. Thus for certain small prime numbers, the number of multiplications required to be performed, and the corresponding hardware to carry out the multiplications, are reduced.

Numerous approaches to implementing Discrete Fourier Transform signal processors have been employed. The fastest known processors employ Fast Fourier Transform mechanizations. The speed of the known processors is limited by the number of multiplications the particular processor must perform. For example, the FFT processor disclosed in U.S. Pat. No. 3,783,258 transforms 4096 complex points into Fourier coefficients in about 10 milliseconds, and the FFT processor disclosed in U.S. Pat. No. 3,920,978 transforms 1024 points in about 25 milliseconds. Other examples of the prior art approaches to this type of signal processing are included in U.S. Pat. Nos. 3,899,667; 3,777,131; 3,778,604 and 3,952,186.

The fastest known prior art TTL technology processor processes data at approximately a 6 MHz complex signal data rate or a real signal data processing rate of 12 MHz. However, there may be situations in which a real signal data processing rate of 16 MHz or higher may be desirable.

For example, in a typical Doppler radar application, 100 nanosecond pulses of energy may be transmitted at 500 nanosecond intervals. In order to locate and process the return energy, the interval between successive pulses is divided into four intervals called range cells and a predetermined number of samples are taken in each range cell (e.g., 120 samples). Since a target will move only slightly in range from pulse to pulse, e.g., a target moving at 10,000 ft./sec. will move 0.005 ft. in one interpulse period, data can be collected from corresponding range cells in successive interpulse period in order to perform a frequency analysis.

The data collected over a predetermined time interval such as 60 microseconds is reordered so that all the data from the same range cells is grouped together. With the exemplary figures above, therefore, there are four sets of 120 data points (samples) to independently process. For a particular range cell, there is a new piece of complex data every 500 nanoseconds (a 2 MHz complex data rate). Thus, there is a need to process data at a 4 MHz real data rate and since there are four such sets of data collected, the overall real data rate is 16 MHz.

In other words, a typical frequency analysis application may require processing signals in sets of 480 complex data points, with each set representing 120 discrete samples in each of four successive cells. If 480 complex data points are to be processed every 60 microseconds, and if each complex data point has a real and an imaginary part, then the overall real signal data processing rate is 16 MHz. The data therefore must be processed at a 4 MHz real signal data rate in each of four cells.

When known prior art processors are used in this application, an FFT processor is required for each pair of range cells since the FFT processor has only a 6 MHz complex data rate. One version of the processor in the present invention, however, is capable of processing data at a 24 MHz real data rate with less hardware than the known prior art FFT mechanizations required to process at a 12 MHz real data rate.

The foregoing and other dramatic improvements in the art of spectral analysis of signals are provided in the signal processor and method according to the present invention which utilizes novel data manipulation and processing techniques in conjunction with the most desirable aspects of the foregoing techniques to eliminate the need for complex multipliers in each processor stage, to eliminate the need for complex phase shifters or twiddle factor multipliers between each stage, and to minimize the number of multipliers in the processor and the number of multiplications the processor must perform.

These and other advantages and novel features of the present invention will become apparent to those skilled in the art from the following detailed description of the present invention when considered in conjunction with the accompanying drawings.

BRIEF DESCRIPTION OF THE DRAWINGS

FIGS. 3A-3C are functional block diagrams illustrating in greater detail various forms of the add/subtract accummulator circuits for the first and last stages of the computational stage of FIG. 2;

FIGS. 4A-4D are functional block diagrams illustrating in greater detail various forms of the multiply/accummulator circuits for the second stage of the computational stage of FIG. 2;

FIG. 5 is a generalized functional block diagram of a processor according to the present invention in which the computational DFT stages are for even or odd integers;

FIG. 8 is a functional block diagram illustrating in greater detail the processor of FIG. 7 and, in particular, the data memory and memory buffer (register) circuits;

FIG. 9 is a functional block diagram illustrating in greater detail one of the real and imaginary data memories of FIGS. 7 and 8;

FIGS. 10A and 10B are functional block diagrams illustrating in greater detail the input and output registers of the processor of FIG. 8;

FIGS. 11A-11C are flow graphs illustrating the data flow for one embodiment of the respective three point, five point and eight point computational stages of FIGS. 7 and 8 when employing a parallel processing technique;

FIGS. 12A-12C are schematic block diagrams illustrating schematically one implementation of each of the three, five and eight point computational stages, respectively; and FIGS. 13A-13C illustrate a prior art FFT processor for 128 data points for comparitive purposes.

DETAILED DESCRIPTION

Figure 1:
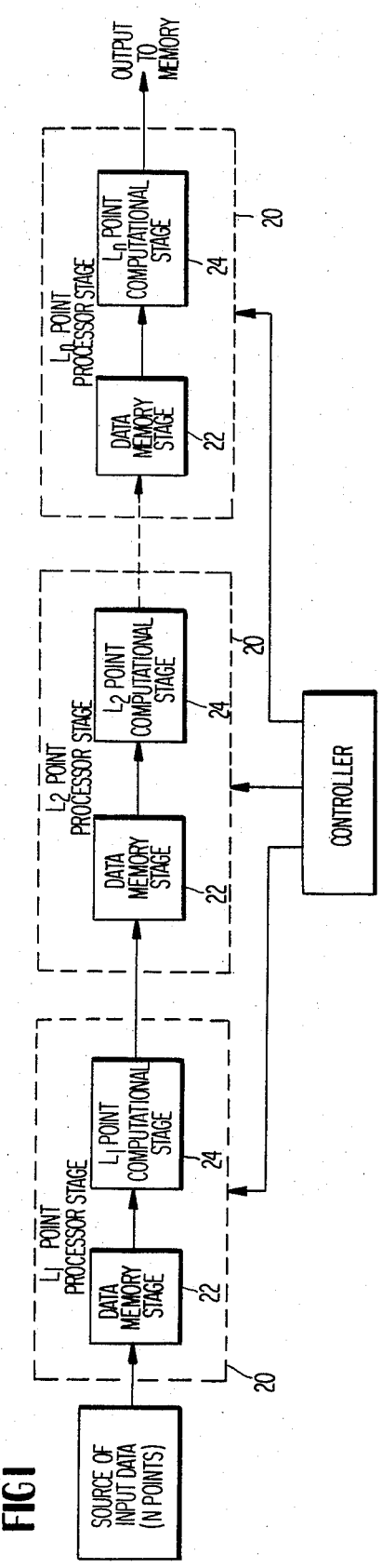
FIG. 1 is a functional block diagram of a generalized N point processor with $N=L_1.L_2.....L_n$ arranged in accordance with the present invention.

The present invention relates to a novel signal processing method and system that analyzes the frequency characteristics of a signal. To facilitate a description of the invention, it is described hereinafter in a Doppler radar environment and a theoretical, mathematical development relating to the invention is provided. Also, a comparison with known prior art devices in the Doppler radar environment is provided in order that the dramatic improvements in speed and hardware simplicity will be appreciated. The order of presentation is not intended to be in any way restrictive, but, rather, is intended to assist one skilled in the art to gain a more rapid appreciation of the invention.

Moreover, it should be understood that the invention has numerous applications other than in Doppler radar systems. The invention, in fact, has general application to any field in which the spectral content of a signal is to be accurately analyzed. For instance, in addition to tracking radar systems of the Doppler variety the invention may be used to analyze the frequency content of signals developed in various radar and sonar applications, storm monitoring systems, navigation systems, guidance systems, seismic analysis systems, speech reproduction and analysis systems, to name a few.

I. THEORETICAL CONSIDERATIONS

A theoretical discussion of certain aspects of the Discrete Fourier Transform (DFT) and the Multidimensional Discrete Fourier Transform (MDFT) will assist in an understanding of the theory of the invention since these transforms provide a theoretical base from which to start. In particular, the following discussion of the MDFT shows one familiar form of decomposition of complex terms in known MDFT signal processing techniques. From this initial discussion, it will be seen that the present invention employs a decomposition technique for the DFT that greatly simplifies the frequency analysis of a signal and results in increased processing speed with decreased hardware for a particular processor stage. Moreover, it will be seen that other theoretical considerations lead to a unique method and system not only of individual processing stages but also of cascaded processing stages.

A. Multidimensional Discrete Fourier Transform Theory

The magnitude and phase A of any frequency component k of the Discrete Fourier Transform of a set of N input data samples $a_n$ resulting from suitably digitizing a continuous input signal is given by the equation:

$$A_k = \sum_{n=0}^{N-1} a_n e^{-j\frac{2\pi}{N}kn} = \sum_{n=0}^{N-1} a_n W^{kn} \qquad (1)$$

where $A_k$ and $a_n$ are complex numbers and where W is the exponential term $\exp(-j2\pi/N)$.

If N, the number of input data samples, is equal to the product of two integers L and M, that is, if N=LM, then Multidimensional Discrete Fourier Transform Theory can be used to further decompose the k-th term of the DFT given above in equation (1). Thus, where every Lth data sample is grouped together, equation (1) can be rewritten as follows:

$$A_k = \sum_{i=0}^{L-1} W^{ki} \sum_{m=0}^{N-1} a_{Lm+i} W^{kLm} \qquad (2)$$

If the following substitution of variables is made for k:

$$k = rM + s \qquad \begin{array}{l} r = 0, 1, 2, \ldots, L-1 \\ s = 0, 1, 2, \ldots, M-1 \end{array}$$

Then equation (2) can be rewritten as follows:

$$A_{rM+s} = \sum_{i=0}^{L-1} (W^M)^{ri} \left[ W^{si} \sum_{m=0}^{M-1} a_{Lm+i}(W^L)^{sm} \right] \qquad (3)$$

or $$A_{rM+s} = \sum_{i=0}^{L-1} (W^M)^{ri} [W^{si}\Phi]$$

where $$\Phi = \sum_{n=0}^{M-1} a_{Lm+i}(W^L)^{sm}$$

The term $\Phi$ is the M-point DFT of the input data samples $a_{Lm+i}$ for a given value of i, and the term $W^{si}$ is a multiplicative factor, generally called a Twiddle Factor, which represents a phase shift. The term $A_{TM+s}$ is the L-point DFT of the bracketed expression of equation (3), or in other words, the L-point DFT of the M-point DFT of the data set $a_{Lm+i}$ for a given i multiplied by an appropriate Twiddle Factor.

Equation (3) therefore indicates that an N=LM point DFT may be obtained for N input data samples by sequentially computing the M-point DFT of L sets of input data, multiplying these coefficients by the appropriate Twiddle Factors and then computing the L-point DFT of each of M sets of numbers.

B. Theory of Decomposition According to the Invention for All Odd Integers

It will be appreciated by one skilled in the art that decomposition of the DFT by the multidimensional DFT approach can lead to processor implementations for small point transforms which are integral powers of 2. Of course, numerous multiplications are required within each processor stage and between stages.

According to the present invention, decomposition of the DFT is accomplished in such a way that the processor need not perform numerous multiplications and both the speed and size of the processor are minimized.

Decomposition of the Discrete Fourier Transform in accordance with the invention will first be described theoretically for the general case of an odd number of points. It will also be shown theoretically that according to the invention the transform need only be decomposed for prime numbers and powers of primes rather than for all odd numbers. However, the decomposition below is in its most general form and thus provides the option of not completely decomposing the DFT of a product of primes into its multidimensional form.

For N - odd integer the DFT equation is $$\begin{bmatrix} A_0 \\ A_1 \\ A_2 \\ \vdots \\ A_{N-1} \end{bmatrix} = \begin{bmatrix} W^0 & W^0 & W^0 & \dots & W^0 \\ W^0 & W^1 & W^2 & \dots & W^{N-1} \\ W^0 & W^2 & W^4 & \dots & W^{2(N-1)} \\ \vdots & \vdots & \vdots & & \vdots \\ W^0 & W^{N-1} & W^{2(N-1)} & \dots & W^{(N-1)2} \end{bmatrix} \begin{bmatrix} a_0 \\ a_1 \\ a_2 \\ \vdots \\ a_{N-1} \end{bmatrix} \quad (4)$$

where $W = e^{-j(2\pi/n)}$, $a_i = i^{th}$ complex input time sample; and, $A_i = i^{th}$ complex output frequency sample.

Decomposition of the DFT according to the invention is based on the observation that:

$$W^{db} a_d + W^{(b)(N-d)} a_{N-d} = W^{bd} a_d + W^{-bd} a_{N-d} = \cos 2\pi \frac{bd}{N} (a_d + a_{N-d}) - j \sin \frac{2\pi \, bd}{N} (a_d - a_{N-d}) \quad (5)$$

Therefore, by performing $a_d \pm a_{N-d}$ for all $d = 1, 2, \ldots, N-1,/2$ the matrix equation can be rewritten with entries that are either real or imaginary but never complex.

$$\begin{bmatrix} A_0 \\ A_1 \\ A_2 \\ \vdots \\ A_{n-1} \end{bmatrix} = \begin{bmatrix} 1 & 1 & 0 & \dots & 1 & 0 \\ 1 & \cos\frac{2\pi}{N} & -j\sin\frac{2\pi}{N} & \dots & \cos\frac{(N-1)\pi}{N} & -j\sin\frac{(N-1)\pi}{N} \\ 1 & \cos\frac{4\pi}{N} & -j\sin\frac{4\pi}{N} & \dots & \cos\frac{2(N-1)\pi}{N} & -j\sin\frac{2(N-1)\pi}{N} \\ \vdots & \vdots & \vdots & & \vdots & \vdots \\ 1 & \cos\frac{2(N-1)\pi}{N} & -j\sin\frac{2(N-1)\pi}{N} & \dots & \cos\frac{(N-1)^2\pi}{N} & -j\sin\frac{(N-1)^2\pi}{N} \end{bmatrix} \begin{bmatrix} a_0 \\ a_1 + a_{n-1} \\ a_1 - a_{n-1} \\ \vdots \\ a_{\frac{N-1}{2}} - a_{\frac{N+1}{2}} \end{bmatrix} \quad (6)$$

Additionally, $$\cos \frac{2\pi}{N}(ab) = \cos \frac{2\pi}{N} aN \cos \frac{2\pi a(N-b)}{N} + \sin \frac{2\pi aN}{N} \sin \frac{2\pi a(N-b)}{N} = \cos \frac{2\pi a(N-b)}{N} \quad (7)$$

and:

$$\sin \frac{2\pi}{N}(ab) = \sin \frac{2\pi aN}{N} \cos \frac{2\pi a(N-b)}{N} - \sin \frac{2\pi a(N-b)}{N} \cos \frac{2\pi aN}{N} = -\sin \frac{2\pi}{N} a(N-b) \quad (8)$$

Therefore, the "cosine" entries in the equation (6) matrix are the same for $A_b$ as they are for $A_{N-b}$. Similarly, the "sine" entries in the equation (6) matrix are the same for $A_b$ and $A_{N-b}$ except for the sign. This suggests that the computations may be further simplified by accumulating the "cosine" terms and the "sine" terms separately and then properly adding the results.

If $A_b = A_{bR} + j A_{bI}$ and $a_i = a_{iR} + j a_{iI}$, then the observations above lead to the following set of computations to obtain the N-point DFT:

(1) First the sums and differences of the real and imaginary parts of the input data are calculated and stored.

$$a_{iR} + a_{(N-i)R} = S_{iR}^+ \quad i = 1, 2, \ldots, \frac{N-1}{2} \quad (9)$$

$$a_{iR} - a_{(N-i)R} = S_{iR}^- \quad i = 1, 2, \ldots, \frac{N-1}{2}$$

-continued $$\sum_{i=0}^{N-1} a_{iR} = S_{or}^+$$

$$a_{iI} + a_{(N-i)I} = S_{iI}^+ \quad i = 1, 2, \ldots, \frac{N-1}{2} \quad (10)$$

$$a_{iI} - a_{(N-i)I} = S_{iI}^-  \quad i = 1, 2, \ldots, \frac{N-1}{2}$$

$$\sum_{i=0}^{N-1} a_{iI} = S_{oI}^+$$

If the input data is fed into the equation (9) and (10) computations in pairs:

$$a_{iR}, a_{(N-i)R} \quad i = 1, 2, \ldots, \frac{N-1}{2}$$

or $$a_{iI}, a_{(N-i)I} \quad i = 1, 2, \ldots, \frac{N-1}{2}$$

$$a_{0I}$$

then these computations can be performed in three data channels. The first data channel computes all the $S^+_{iR}$, $S^+_{iI}$ for $i = 1, 2, \ldots, N-1/2$; the second data channel computes all the $S^-_{iR}$, $S^-_{iI}$ for $i = 1, 2, \ldots, N-1/2$ and the third data channel computes $S^+_{OR}$, $S^+_{OI}$ because the $A_0$ term is different than all the rest.

(2) Next the sums of products of "cosine" and "sine" terms must be computed. As observed above this needs only be done up to $(N-1)/2$:

$$T_{bR} = \sum_{i=1}^{\frac{N-1}{2}} S^+_{iR} \left( \cos \frac{2\pi}{N} bi - 1 \right) + S^+_{OR} \quad (11)$$

$$b = 1, 2, \ldots, \frac{N-1}{2}$$

$$T_{bI} = \sum_{i=1}^{\frac{N-1}{2}} S^-_{iR} \left( \sin \frac{2\pi}{N} bi \right) \quad b = 1, 2, \ldots, \frac{N-1}{2} \quad (12)$$

$$U_{bR} = \sum_{i=1}^{\frac{N-1}{2}} S^-_{iI} \left( \sin \frac{2\pi}{N} bi \right) \quad b = 1, 2, \ldots, \frac{N-1}{2} \quad (13)$$

$$U_{bI} = \sum_{i=1}^{\frac{N-1}{2}} S^+_{iI} \left( \cos \frac{2\pi}{N} bi - 1 \right) + S^+_{OI} \quad (14)$$

$$b = 1, 2, \ldots, \frac{N-1}{2}$$

Since the "cosine" terms are multiplying complex numbers the result has been a contribution to both the real and imaginary portions of the output ($T_{bR}$, $U_{bI}$). Similarly, the "sine" terms contribute to both the real and imaginary portions of the output ($T_{bI}$, $U_{bR}$). $S^+_{OR}$ and $S^+_{OI}$ are retained since they represent the components of $A_0$.

(3) The final step is to properly combine the real and imaginary portions of the above computations and make use of symmetry to compute the $A_{(N-b)} b = 1, 2, \ldots, \frac{N-1}{2}$.

$A_{OR} = S^+_{OR}$ (15)

$A_{OI} = S^+_{OI}$ (16)

$A_{bR} = T_{bR} + U_{bR} \quad b = 1, 2, \ldots, \frac{N-1}{2}$ (17)

$A_{(N-b)R} = T_{bR} - U_{bR} \quad b = 1, 2, \ldots, \frac{N-1}{2}$ (18)

$A_{bI} = U_{bI} - T_{bI} \quad b = 1, 2, \ldots, \frac{N-1}{2}$ (19)

$A_{(N-b)I} = U_{bI} + T_{bI} \quad b = 1, 2, \ldots, \frac{N-1}{2}$ (20)

$W^{bd} a_b + W^{(n-b)d} a_{N-b} = W^{bd} a_b + W^{-bd} a_{N-b}$ $\quad = \cos \frac{2\pi}{N} bd (a_b + a_{N-b}) - j \sin \frac{2\pi}{N} bd (a_b - a_{N-b})$ for $b = 1, 2, \ldots, \frac{N}{2} - 1$ and $W^0 a_o + W^{Nd/2} a_{N/2} = a_o \pm a_{N/2}$ depending on whether d is even or odd. Therefore equation (21) can be rewritten such that all the members of the matrix are either real or imaginary but never complex.

(22)

$$\begin{bmatrix} A_0 \\ A_1 \\ A_2 \\ A_3 \\ A_4 \\ \vdots \\ A_{N-1} \end{bmatrix} =$$

$$\begin{bmatrix} 1 & 0 & 1 & 0 & \ldots & 1 & 0 \\ 0 & 1 & \cos\frac{2\pi}{N} & -j\sin\frac{2\pi}{N} & \ldots & \cos\frac{2\pi}{N}\left(\frac{N}{2}-1\right) & -j\sin\frac{2\pi}{N}\left(\frac{N}{2}-1\right) \\ 1 & 0 & \cos\frac{4\pi}{N} & -j\sin\frac{4\pi}{N} & \ldots & \cos\frac{4\pi}{N}\left(\frac{N}{2}-1\right) & -j\sin\frac{4\pi}{N}\left(\frac{N}{2}-1\right) \\ 0 & 1 & \cos\frac{6\pi}{N} & -j\sin\frac{6\pi}{N} & \ldots & \cos\frac{6\pi}{N}\left(\frac{N}{2}-1\right) & -j\sin\frac{6\pi}{N}\left(\frac{N}{2}-1\right) \\ 1 & 0 & \cos\frac{8\pi}{N} & -j\sin\frac{8\pi}{N} & \ldots & \cos\frac{8\pi}{N}\left(\frac{N}{2}-1\right) & -j\sin\frac{8\pi}{N}\left(\frac{N}{2}-1\right) \\ \vdots & & & & & & \\ 0 & 1 & \cos\frac{2\pi}{N}(N-1) & -j\sin\frac{2\pi}{N}(N-1) & \ldots & \cos\frac{2\pi}{N}\left(\frac{N}{2}-1\right)(N-1) & -j\sin\frac{2\pi}{N}\left(\frac{N}{2}-1\right)(N-1) \end{bmatrix} \begin{bmatrix} a_0 + a_{\frac{N}{2}} \\ a_0 - a_{\frac{N}{2}} \\ a_1 + a_{N-1} \\ a_1 - a_{N-1} \\ \vdots \\ a_{\frac{N}{2}-1} + a_{\frac{N}{2}+1} \\ a_{\frac{N}{2}-1} - a_{\frac{N}{2}+1} \end{bmatrix}$$

C. Theory of Decomposition According to the Invention For $N=2^r$ Points

This section theoretically describes decomposition of the Discrete Fourier Transform according to the invention for the case of $N=2^r$, $r \geq 2$ points. The two point transform is a trivial case that is just the sum and difference of the input samples. The four and eight point transforms are also special cases of the general decomposition.

The Discrete Fourier Transform equations for $N=2^r$ can be written in matrix form as:

$$\begin{bmatrix} A_0 \\ A_1 \\ A_2 \\ \vdots \\ A_{N-1} \end{bmatrix} = \begin{bmatrix} W^0 & W^0 & W^0 & \ldots & W^0 \\ W^0 & W^1 & W^2 & \ldots & W^{N-1} \\ W^0 & W^2 & W^4 & \ldots & W^{2(N-1)} \\ \vdots & & & & \\ W^0 & W^{N-1} & W^{2(N-1)} & \ldots & W^{(N-1)2} \end{bmatrix} \begin{bmatrix} a_0 \\ a_1 \\ a_2 \\ \vdots \\ a_{N-1} \end{bmatrix}$$ (21)

The fundamental observation to be made is that:

where
$a_i = i^{th}$ complex input time sample
$\quad = a_{iR} + a_{iI}$
$A_i = i^{th}$ complex output frequency sample
$\quad = A_{iR} + A_{iI}$ Additionally for $a = 1, 2, \ldots, N/2 - 1$ $\left. \begin{array}{l} \cos \frac{2\pi}{N} ab = \cos \frac{2\pi}{N} (N-b)a \\ \sin \frac{2\pi}{N} ab = -\sin \frac{2\pi}{N} (N-b)a \end{array} \right\} b = 1, 2, \ldots, \frac{N}{2} - 1$ Therefore, the "cosine" entries in equation (22) are the same for $A_b$ as they are for $A_{N-b}$, $b=1, \ldots, N/2-1$. Similarly, the "sine" entries in equation (22) are the same for $A_b$ and $A_{N-b}$, $b=1, 2, \ldots, N/2-1$ except for the sign. This suggests that the computations may be further simplified by accumulating the "cosine" terms and the "sine" terms separately and then properly adding the results.

Another observation is that for $a = 1, 2, \ldots, N/2-1$ $$\left.\begin{array}{l}\cos\dfrac{2\pi}{N}(ab) = (-1)^a \cos\dfrac{2\pi}{N} a\left(\dfrac{N}{2} - 1\right) \\ \\ \sin\dfrac{2\pi}{N}(ab) = -(-1)^a \sin\dfrac{2\pi}{N} a\left(\dfrac{N}{2} - b\right)\end{array}\right\} b = 0,1,2,\ldots,\dfrac{N}{4}$$

This observation has several effects on the computation of equation (22):

(1) If "a" is even, the "cosine" term does not change sign going from $A_b$ to $A_{N/2-b}$ but it does change sign if "a" is odd. This suggests that computation of the "cosine" term should be subdivided into two computations which are then properly added; namely a summation of "cosine" terms with "a" even and one for "a" odd from $b=0, 1, 2, \ldots, N/4$.

(2) If "a" is odd, the "sine" term does not change sign going from $A_b$ to $A_{N/2-b}$ but it does change sign if "a" is even. This suggests that computation of the "sine" terms should be accomplished in two separate summing operations; namely a summation of "sine" terms with "a" odd and one for "a" even over $b=0, 1, \ldots, N/4$.

These observations provide significant reduction in the required computations for the $N=2^r$ point transform. The one additional set of terms to deal with are those in columns 1 and 2 of equation (22) because they do not follow the same format as all other columns.

The $a_0+a_{N/2}$ terms could be carried along separately through the processing and then added at the end. However, this would mean that each would have to be present for $N/2$ of the output frequency terms and this would cause a data processing slow down or the need for $N/2$ data accumulators on the output, whereas only four output accumulators would otherwise be needed to properly combine the "sine" and "cosine" summations described above. The alternative is to find "sine" or "cosine" summations that will always be added at the output. Then the $a_0+a_{N/2}$ terms could be added into these summations as an extra term. For $b=0, 2, \ldots, N/4$, the term to be added is $a_0+a_{N/2}$ and for $b=1, 3, 5, \ldots, N/4-1$, the term to be added is $a_0-a_{N/2}$. The cosine summation for "a" "even" satisfies the requirements and thus will be subdivided into two summations to handle the two terms.

The above discussion leads to the following set of steps for computing the $N=2^r$ point DFT using the decomposition technique of the present invention.

(1) First, the sums and differences of the real and imaginary parts of the input data are calculated and stored.

$$a_{OR} + a_{\frac{N}{2}R} = S^+_{OR}; \quad a_{OR} - a_{\frac{N}{2}R} = S^-_{OR} \tag{23}$$

$$a_{iR} + a_{(N-i)R} = S^+_{iR} \quad i = 1, 2, \ldots, \frac{N}{1} - 1 \tag{24}$$

$$a_{iR} + a_{(N-i)R} = S^-_{iR} \quad i = 1, 2, \ldots, \frac{N}{2} - 1 \tag{25}$$

$$a_{OI} + a_{\frac{N}{2}I} = S^+_{OI} \tag{26}$$

$$a_{OI} - a_{\frac{N}{2}I} = S^-_{OI} \tag{27}$$

$$a_{iI} + a_{(N-i)I} = S^+_{iI} \quad i = 1, 2, \ldots, \frac{N}{2} - 1 \tag{28}$$

$$a_{iI} - a_{(N-i)I} = S^-_{iI} \quad i = 1, 2, \ldots, \frac{N}{2} - 1 \tag{29}$$

If the input data are fed into this set of computations in pairs:

$$a_{OR}, a_{4R}$$

$$a_{iR}, a_{(N-i)R} \quad i = 1, 2, \ldots, \frac{N}{2} - 1$$

$$a_{OI}, a_{4I}$$

$$a_{iI}, a_{(N-i)I} \quad i = 1, 2, \ldots, \frac{N}{2} - 1$$

Then these computations can be performed by computing and storing all the $S^+_{iR}$, $S^+_{iI}$ for $i=0, 1, \ldots, N/2-1$ and all the $S^-_{iR}$, $S^-_{iI}$ for $i=0, 1, \ldots, N/2-1$ in only two data input channels.

(2) Second the sums of products of "cosines" and "sines" must be computed. The equations below are a result of the above discussion.

$$T^E_{bR} = \sum_{i=1}^{\frac{N}{4}-1} S^+_{2iR} \cos\frac{2\pi}{N} b(2i) + S^+_{OR} \quad b = 0, 2, 4, \ldots, \frac{N}{4} \tag{30}$$

$$T^E_{bR} = \sum_{i=1}^{\frac{N}{4}-1} S^+_{2iR} \cos\frac{2\pi}{N} b(2i) + S^-_{OR} \tag{31}$$

$$b = 1, 3, 5, \ldots, \frac{N}{4} - 1$$

$$T^o_{bR} = \sum_{i=0}^{\frac{N}{4}-1} S^+_{(2i+1)R} \cos\frac{2\pi}{N} b(2i + 1) \tag{32}$$

$$b = 0, 1, 2, \ldots \frac{N}{4} - 1$$

Note here that $T^o_{(N/4)R}=0$ because $$\cos\frac{2\pi}{N} \frac{N}{4} (2i + 1) = 0 \text{ for all } i = 0, 1, 2, \ldots, \frac{N}{4} - 1.$$

$$T^E_{bI} = \sum_{i=1}^{\frac{N}{4}-1} S^-_{2iR} \sin\frac{2\pi}{N} b(2i) \quad b = 1, 2, \ldots, \frac{N}{4} - 1 \tag{33}$$

Note here that $T^E_{0I}=0$ since $\sin 0=0$ $$T^E_{\frac{N}{4}I} = 0 \text{ since } \sin\frac{2\pi}{N} \frac{N}{4} 2i = \sin \pi i = 0$$

$$T^o_{bI} = \sum_{i=0}^{\frac{N}{4}-1} S^-_{(2i+1)R} \sin\frac{2\pi}{N} b(2i + 1) \quad b = 1, 2, \ldots, \frac{N}{4}$$

Again noting that $T^o_{0I}=0$.

$$U^E_{bI} = \sum_{i=1}^{\frac{N}{4}-1} S^+_{2iI} \cos\frac{2\pi}{N} b(2i) + S^+_{0I} \quad b = 0, 2, 4, \ldots, \frac{N}{4} \tag{35}$$

$$U^E_{bI} = \sum_{i=1}^{\frac{N}{4}-1} S^+_{2iI} \cos\frac{2\pi}{N} b(2i) + S^-_{0I} \quad b = 1, 3, 5, \ldots, \frac{N}{4} - 1 \tag{36}$$

$$U^o_{bI} = \sum_{i=0}^{\frac{N}{4}-1} S^+_{(2i+1)I} \cos\frac{2\pi}{4} b(2i + 1) \quad b = \tag{37}$$

$$0, 1, 2, \ldots, \frac{N}{4} - 1$$

where: $U^o = 0$ because $\cos\frac{2\pi}{N} \frac{N}{4} (2i + 1) = 0$ for all "$i$"

$$U^E_{bR} = \sum_{i=1}^{\frac{N}{4}-1} S^-_{2iI} \sin\frac{2\pi}{N} b(2i) \quad b = 1, 2, \ldots, \frac{N}{4} - 1 \tag{38}$$

-continued where: $U^E_{0R} = 0$ since $\sin 0 = 0$, and $$U^E_{\frac{N}{4}I} = 0 \text{ since } \sin \frac{2\pi}{N} \frac{N}{4} 2i = \sin \pi i = 0$$

$$U^o_{bR} = \sum_{i=0}^{\frac{N}{4}-1} S_{(2i+1)I} \sin \frac{2\pi}{N} b(2i+1) \quad b = 1, 2, 3, \ldots, \frac{N}{4} \quad (39)$$

Equations (30)–(39) represent 2N different numbers to compute and store in a second 2N point data memory. By observation, no input to this summation sequence is used more than (N/4+1) places. Therefore, these computations can be sequentially performed in (N/4+1) data channels.

(3) Finally the data output channels have the function of properly adding all of the partial sums of "sines" and "cosines" to produce the real and imaginary portions of the outputs.

$$A_{0R} = T^E_{0R} + T^o_{0R} A_{0I} = U^E_{0I} + U^o_{0I} + U^o_{0I} \quad (40)$$

$$A_{bR} = T^E_{bR} + U^E_{bR} + T^o_{bR} + U^o_{bR} \quad b = 0,1,2,\ldots,\frac{N}{4} \quad (41)$$

$$A_{bI} = U^E_{bI} + U^o_{bI} - T^E_{bI} - T^o_{bI} \quad b = 0,1,2,\ldots,\frac{N}{4} \quad (42)$$

$$A\left(\frac{N}{2}-b\right)_R = T^E_{bR} - T^o_{bR} + U^o_{bR} - U^E_{bR} \quad b = 0,1,2,\ldots,\frac{N}{4}-1 \quad (43)$$

$$A\left(\frac{N}{2}-b\right)_I = U^E_{bI} - U^o_{bI} + T^E_{bI} - T^o_{bI} \quad b = 0,1,2,\ldots,\frac{N}{4}-1 \quad (44)$$

$$A_{(N-b)R} = T^E_{bR} - U^E_{bR} + T^o_{bR} - U^o_{bR} \quad b = 1,2,\ldots,\frac{N}{4} \quad (45)$$

$$A_{(N-b)I} = U^E_{bI} + U^o_{bI} + T^E_{bI} + T^o_{bI} \quad b = 1,2,\ldots,\frac{N}{4} \quad (46)$$

$$A\left(\frac{N}{2}+b\right)_R T^E_{bR} - T^o_{bR} - U^o_{bR} + U^E_{bR} \quad b = 1,2,\ldots,\frac{N}{4}-1 \quad (47)$$

$$A\left(\frac{N}{2}+b\right)_I = U^E_{bI} - U^o_{bI} - T^E_{bI} + T^o_{bI} \quad b = 1,2,\ldots,\frac{N}{4}-1 \quad (48)$$

This is a total of 2N computations. Note that each input term is used in exactly four places and a group of four inputs (i.e., $T^E_{bR}$, $U^E_{bR}$, $T^o_{bR}$, $U^o_{bR}$ for a given "b") forms four outputs (i.e., $A_{bR}$, $A_{(N/2-b)R}$, $A_{(N-b)R}$, $A_{(N/2+b)R}$). Therefore the output computation structure can make use of four relatively simple data channels as described hereinafter.

C. Interstage Multipliers and Ring Theory

The preceeding section dealt with the multiplications and thus the multipliers required within a single transform processor stage (intrastage multipliers) when the DFT is performed using a decomposition technique according to the present invention. In this section, the multipliers included between each cascaded processor stage (interstage multipliers) will be dealt with theoretically.

In the discussion regarding equation (3), the mutliplicative term $W^{si}$ was identified as the Twiddle Factor which imparts a phase shift to the data as the data flows from the M-point DFT processor stage to the L-point processor stage in an N=LM point processor formed by cascading an M-point processor with an L-point processor. If L and M are constrained to be relatively prime, that is, if L and M contain no common factors, then the Twiddle Factor multipliers can be replaced by circular rotation of the input data set of both the M-point and L-point transform stages.

The input data set for an N=LM point transform can be represented as an L by M matrix as follows:

$$\text{DATA} = \begin{bmatrix} a_0 \, a_1 & \cdots & a_i & \cdots & a_{L-1} \\ a_L & \cdots & a_{L+i} & \cdots & a_{2L-1} \\ a_{2L} & \cdots & a_{2L+i} & \cdots & a_{3L-1} \\ \vdots & & \vdots & & \vdots \\ a_{(M-1)L} & \cdots & a_{(M-1)L+i} & \cdots & a_{(M-1)L+L-1} \end{bmatrix} \quad (49)$$

wherein every L-th data sample is grouped together such that each of the L columns of the matrix of equation (49) contains an M-point data set. The i-th data set then contains the members $a_i$, $a_{L+i}$, $a_{2L+i}$, ..., $a_{(M-1)L+i}$.

If the i-th data set is circularly rotated by "q i" positions—for example if "q i" equals 1, every member of the i-th data set will be moved up one position in the i-th column of the matrix of equation (49) and the top most member would move to the bottom most location and the rotated i-th data set will then contain the members $a_{L+i}$, $a_{2L+i}$, ..., $a_{(M-1)L+i}$, $a_i$—then the Twiddle Factor of equation (3) becomes:

Twiddle Factor = $W^{si+Lsqi}$

If the sequence of output terms $A_{rM+s}$ of equation (3) are also rotated but by "b s" positions by substituting $r_{i-bs}$ for r, then the Twiddle Factor becomes:

Twiddle Factor = $W^{si+Lsqi-Msbi}$

Twiddle Factor = $W^{si(qL-bM+1)}$ \quad (50)

It then is apparent that if the term (qL−bM+1) of equation (50) becomes zero, the exponent becomes zero and thus the Twiddle Factor equals unity. Thus the Twiddle Factor multipliers can be eliminated if the term (qL−bM+1) can be made zero.

L and M are relatively prime numbers and thus have no common factors. With this condition imposed upon L and M, ring theory indicates that a unique q and b exist. In this regard it must be borne in mind that even though there is one equation with two unknowns, a unique q and b exist since additional constraints have already been implicitly imposed upon both q and b. Since the i-th data set has M members, rotating the members by "q i" positions, or (M+"q i") positions or (2M+"q i") positions, and so forth, places the data members in the same relative locations in the data set. Hence, $0 \leq q < M$. Similarly, since the output term $A_{rM+s}$ constitutes an L element set, rotating the members by "b s" positions or (L+"b s") positions or (2L+"b s") positions, and so forth, places the members in the same relative locations in the data set. Hence, $0 \leq b < L$. Thus, these range constraints which are implicitly imposed upon q and b result in a unique value for both q and b.

Thus the Twiddle Factor multiplier can be eliminated between the cascaded stages provided the input data for each stage is suitably rearranged.

II. Generalized Processor According to the Present Invention

The foregoing theoretical considerations can be used in an efficient manner to produce a novel processor and processing method. In general, as illustrated in FIG. 1, a processor for N data points according to the present invention consists of k cascaded stages such that:

$$N = \pi_{n=1}^{k} L_n$$

where all the $L_n$'s are relatively prime. Each L point processor stage 20 includes a data memory stage 22 and an $L_n$-point computational stage 24 as described hereinafter in detail.

The $L_n$'s are preferably relatively prime in order that the Twiddle Factors can be removed and replaced by suitable data rotation. The decomposition technique according to the invention is implemented in the computational stage to assure that the intrastage multipliers are real or imaginary but never complex.

The input data is first reordered into $(N/L_1)$ data sets of $L_1$ members where $L_1$ is the number of data points of the first processor stage 20. Each data set is then rotated a suitable amount (see Section I, subsection C), and an $L_1$-point computation using the decomposition is then performed on each data set. The output of this first processor stage is then reordered into $(N/L_2)$ data sets of $L_2$ members (where $L_2$ is the number of data points of the second processor stage). Each of these data sets are rotated a suitable amount, and an $L_2$-point computation is then performed on each data set. This process is continued for each successive stage $L_n$, reordering the previous stage's output into $(N/L_n)$ data sets of $L_n$ members, rotating each data set and then performing an $L_n$-point computation on each data set.

The data memory 22 is utilized to suitably reorder and rotate the input data to each of the stages. As will be described subsequently in greater detail, different memories are used for the real and the imaginary components of the data, and each such memory is subdivided into two halves so that one half can read data out while the other half writes data in. The real data rate can be up to 24 MHz.

A. Computational Stage For Odd Integers

It will be appreciated from the theoretical considerations discussed previously that the DFT for an odd integer can be performed using the present decomposition technique with a minimum of multiplication steps. One implementation of the computational stage employing the previously described decomposition technique and employing a minimum of circuit components is illustrated in general form in FIG. 2. While the generalized implementation of FIG. 2 is believed to be a relatively efficient implementation of the previously described DFT decomposition and computation technique for odd integers, it should be understood that there may be other implementations that will be apparent to one skilled in the art and the FIG. 2 embodiment is not considered to be exhaustive of all possibilities.

Figure 2:
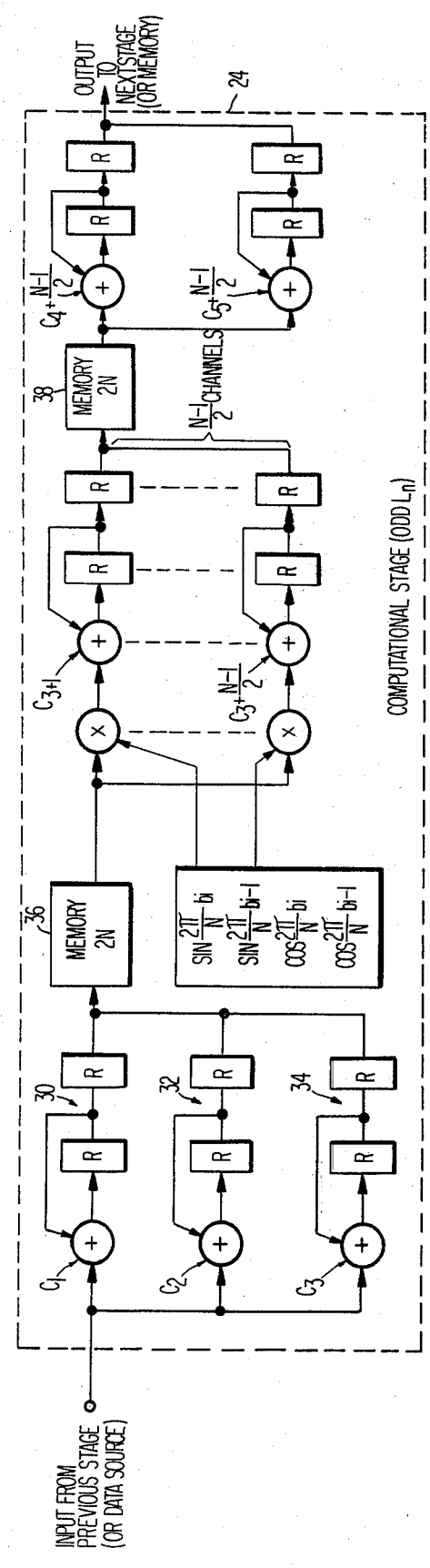
FIG. 2 is a functional block diagram illustrating in greater detail one form of an odd integer L point computational stage of the system of FIG. 1.

Referring now to FIG. 2, the computational stage 24 may be viewed as one way of performing the three stages or steps of calculations represented by equations (9)–(20) previously discussed. As was previously mentioned in Section I, subsection B hereof, the first step performed by the computational stage is to obtain the sums and differences of the real and imaginary parts of the input data after it is appropriately grouped into sets and reordered (equations (9) and (10)). This initial computation is performed in three data channels 30, 32 and 34. Each data channel preferably includes a conventional summing circuit $(+)$, and data accumulators or registers (R). A first data channel 30 computes all the sums of the real and imaginary components $S^+_{iR}$, $S^+_{iI}$ for $i = 1, 2, \ldots, N-1/2$. A second data channel 32 computes all the differences of the real and imaginary components $S^-_{iR}$, $S^-_{iI}$ for $i = 1, 2, \ldots, N-1/2$. A third data channel 34 computes the sums of the amplitudes of the real and imaginary time samples of the input data $S^+_{0R}$, $S^+_{0I}$.

The algebraic summation of this first computing step is accomplished by suitable conventional summing circuits and registers in each data channel. The input data signal is fed to the summing circuit together with the previously stored partial sum from the first storage register. The summing circuit performs algebraic summations to obtain the sums and differences under the control of timing control signals C1, C2 and C3 from the controller of FIG. 1 such that only the appropriate data related to a data channel is summed at any particular instant in that data channel.

The sum and difference values are stored in a memory 36 having 2N storage locations. These values are then supplied to suitable conventional multipliers $(\times)$ and summing circuits $(+)$ in a group of $N-1/2$ data channels in order to compute the products of the cosine and sine terms and their sums as set forth in equations (11)–(14). Specifically, the data from the memory 36 is fed to a conventional multiplier $(\times)$ together with the appropriate sine and cosine terms. The input data from the memory is applied to the multipliers in the following sequence:

$$S^+_{oR};\ S^+_{oR};\ S^+_{iR}\ i = 1,2,\ldots,\frac{N-1}{2};\ S^-_{iR}\ i = 1,2,\ldots,\frac{N-1}{2};$$

$$S^+_{oI};\ S^+_{oR}\ S^-_{iI}\ i = 1,2,\ldots,\frac{N-1}{2};\ \text{and}\ S^-_{iI}\ i = 1,2,\ldots,\frac{N-1}{2}$$

The multiplier output signals are supplied to summing circuits controlled by timing control signals $C_{3+1}$ through $C_{3+(N-1)/2}$ in order to succesively sum the new data and partial sums stored in a first data accumulator or register R. The output data from each of the $N-1/2$ data channels are supplied from a second register R to a memory 38 having 2N data storage locations.

The third step performed by the computational stage 24 is to combine the real and imaginary portions of the data stored by the memory 38 in order to compute the A values as set forth in equations (15)–(20). By taking advantage of the fact that the entries of the computational steps appear twice in the computations (e.g., $U_{bI}$ appears in both the computation for $A_{bI}$ and the computation for $A_{(N-B)I}$), only two data channels are required with the following input data sequence from the memory 38: $S^+_{oR}$; $S^+_{oI}$, $T_{bR},U_{bR}$ (b=1,2,...,N-1/2) $U_{bI},T_{bI}$ (b=1,2,...,N-1/2).

The computations of this third step may be accomplished by suitable conventional summing circuits $(+)$ and accumulators or registers R. Control of the sequence in which data is fed to the data channels may, of course, be controlled in this computational step as in others by the sequence in which the memory is addressed by the controller. Similarly, the algebraic summation of the appropriate data by the appropriate data channel may be controlled as in previous computational steps by timing control signals $C_{4+N<1/2}$ and $C_{5+N-1/2}$.

In this latter regard, the timing control signals $C_i$ (where i+1, 2, 3, ..., 5+N−1/2) can have four control functions, namely:
(1) Subtract the new input data from the partial sum
(2) Add the new input data to the partial sum
(3) Ignore the new input data
(4) Reset the accumulator (register) and start a new cycle.

In the odd integer embodiment of FIG. 2, the "ignore the new input data" control function or command is not required. The "add new input" and "reset accumulator" commands are always required and the "substract" command is required in the $C_2$; $C_4(C_{3+1})$, $C_5$, ..., $C_{3+N-1/2}$; and $C_{5+N-1/2}$ timing control signals. There are numerous conventional ways of summing, subtracting, multiplying and accumulating in the various data channels of the FIG. 2 embodiment. The most desirable will depend on such considerations as speed, power, cost and availability of a given technology at the time of implementation. Certain possible implementations of the add/subtract accumulator and the multiply/accumulator data channels are illustrated in FIGS. 3A–3C and 4A–4D, respectively.

Referring to FIGS. 3A–3C, there are shown three embodiments of add/subtract accumulators which may be employed in the first stage data channels 30, 32 and 34 as well as in the third stage data channels. In FIG. 3A, the input data from a previous stage, from a data source or from the memory 38 is applied to a controllable data sign control circuit 40 (e.g., a data inverter/non-inverter in the case analog signal processing) controlled by the appropriate add/subtract control signal $C_i$. The output signal from the sign control circuit 40 is applied to a conventional summing circuit 42 which receives a second input signal from the output terminal of a register 44. The signal from the circuit 42 is supplied as input data to the register 44 and the output signal from the register 44 is supplied to a register 46 as well as to the summing circuit.

It will be appreciated that the summing circuit 42 always performs the algebraic summation of the two input signals so that the sum or difference of the two input signals to the summing circuit may be obtained selectively by controlling the sign of one input signal. Such selective control may be accomplished by selectively inverting (for subtraction) or not inverting (for addition) the input data in response to the control signal $C_i$ or in other suitable manner.

It will also be appreciated that a programmable read-only memory 48 (PROM) may be utilized to selectively add or subtract two input signals as illustrated in FIG. 3B. Alternatively, specific add/subtract accumulators are available in integrated circuit form for processing of the input data in the data channels of the computational stage as shown in FIG. 3C.

Similarly, various multiply/accumulator structures may be utilized for the second section of the computational stage 24 of FIG. 2 as is illustrated in FIGS. 4A–4D. Referring now to FIG. 4A, the input data from the memory 36 of FIG. 2 is supplied to one input terminal of a suitable conventional multiplier 50 and the sine or cosine function is supplied to the other input terminal of the multiplier 50. The output signal from the multiplier 50 is applied to a suitable data sign control circuit 52 which is controlled by an add/subtract signal $C_i$ from the controller. The output signal from the data sign control circuit 52 is applied to one input terminal of a conventional summing circuit 54 and the output signal from the summing circuit is applied to the data input terminal of a suitable conventional register 56. The output signal from the register 56 is applied to the other input terminal of the summing circuit 54 and to a second conventional register 58 which in turn supplies an output signal to the memory 38 of the next section of the computational stage.

It will be appreciated that the multiply/accumulator circuit of FIG. 4A is identical to the circuit of FIG. 3A with the addition of a multiplier as the first stage. Thus, its operation is identical to the circuit of FIG. 3A except that the input signal to the data sign control circuit 52 is the product of the input data and a suitable multiplier value as illustrated.

FIG. 4B illustrates a circuit which employs the add-/subtract accumulator of FIG. 3B with the addition of a programmable read only memory (PROM) 60 which provides an output which is the product of the input data and a suitable one of the sine and cosine functions previously described, e.g., through a table look-up technique. The multiply/accumulator circuit of FIG. 4C makes use of a standard multiply/accumulate integrated circuit chip as illustrated. The multiply/accumulator circuit illustrated in FIG. 4D employs the add/subtract accumulator of FIG. 3C with the addition of a multiplier 62 to provide the product of the input data and the sine and cosine functions in a manner similar to that shown in FIG. 4A.

It is interesting to note in connection with the odd integer embodiment of FIG. 2 that odd integers are either primes, power of primes or products of these two. As was previously described, if the transform size N is decomposable into factors that are relatively prime, then the Discrete Fourier Transform may be performed as a sequence of smaller transform computations. For instance, if N is an odd integer and $N = p_1^{r_1} p_2^{r_2} \ldots p_e^{r_e}$ where $(p_i, p_j) = 1$ when i is unequal to j, then the N point transform can be broken into a sequence of transforms as shown in FIG. 5.

In FIG. 5, each processor stage includes a data memory stage and a $p_i^{r_i}$ point computational stage as was previously described in connection with FIG. 1. This is made possible by the fact that in the FIG. 5 embodiment, all $p_i^{r_i}$ are odd integers and may thus be decomposed as shown. This means that the decomposed solution requires the following amount of hardware:

| | |
|---|---|
| $\sum_{i=1}^{e} (p_i^{r_i} - 1)/2$ | real multipliers |
| $\sum_{i=1}^{e} (p_i^{r_i} + 9)/2$ | real adders |
| $\sum_{i=1}^{e} 4p_i^{r_i}$ | memory inside transforms |
| $2N(e - 1)$ | memory between transforms |

The numbers of multipliers, adders, etc., are always smaller than when performing the transform as one large N point transform. Therefore, when N is odd but decomposable, the decomposed solution is preferred.

The foregoing can be shown by considering $N = p_1 p_2$. If the transform is computed as N points, then it requires:

$$\frac{p_1 p_2 + 9}{2} \quad \text{real accumulators}$$

-continued $$\frac{p_1 p_2 - 1}{2} \quad \text{real multipliers}$$

If the transform is first decomposed into $p_1$ and $p_2$ point transforms then it requires:

$$\frac{p_1 + 9}{2} + \frac{p_2 + 9}{2} \quad \text{real accumulators}$$

$$\frac{p_1 - 1}{2} + \frac{p_2 - 1}{2} \quad \text{real multipliers}$$

To see if the N point decomposition is prudent for certain $p_i$, it is necessary to find cases in which:

$$\frac{p_1 p_2 + 9}{2} < \frac{p_1 + 9}{2} + \frac{p_2 + 9}{2} \tag{51}$$

$$\frac{p_1 p_2 - 1}{2} < \frac{p_1 - 1}{2} + \frac{p_2 - 1}{2} \text{ or} \tag{52}$$

$$p_1 < \frac{p_2 + 9}{p_2 - 1} \tag{53}$$

$$p_1 < 1, \text{ respectively.} \tag{54}$$

Equation (54) has no solution and equation (53) has only the solution $p_1$, $p_2$ equal 3, 5. However, it can be shown that $p = 3$ is a special case that only requires four accumulators instead of the six obtained by using the formula. This means that equation (53) does not have a solution and thus it is always better to first decompose an odd integer where possible.

B. Computational Stage for $N = 2^r$ Points

In Section I, Subsection C of this application there was discussed the theory of decomposition according to the invention for N equals $2^r$ points. One embodiment of a computational stage for numbers $N = 2^r$ is illustrated in FIG. 6.

Figure 6:
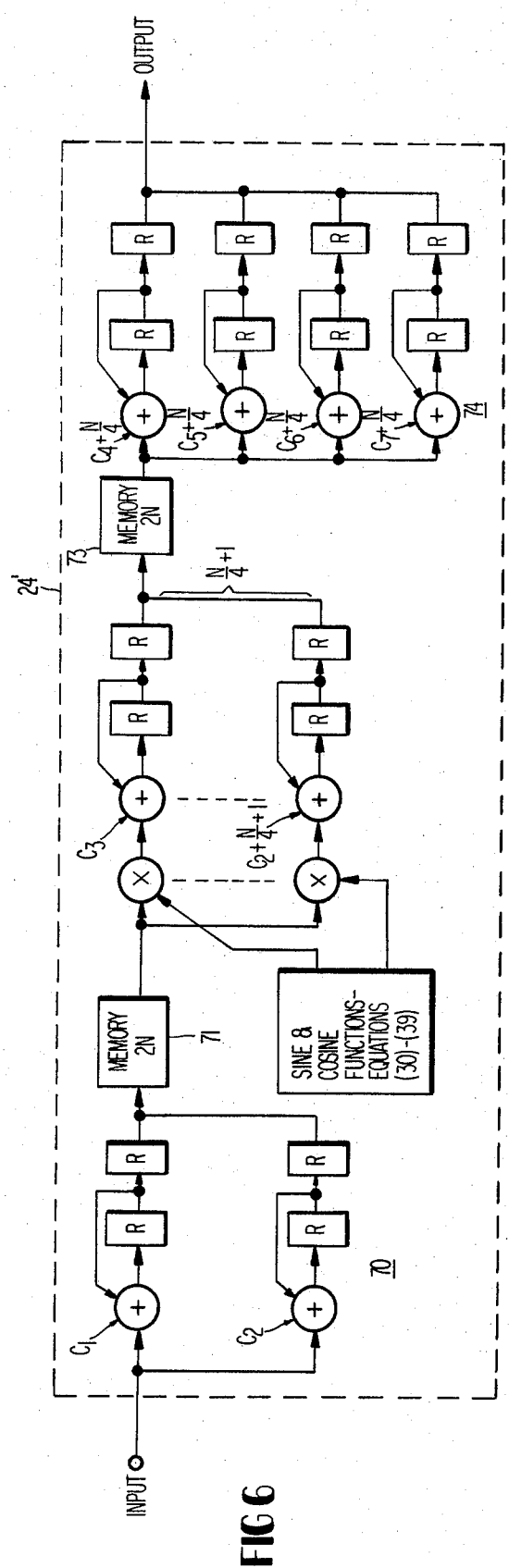
FIG. 6 is a functional block diagram illustrating in greater detail one form of an even integer computational stage of the processor of FIG. 5.

Referring now to FIG. 6, the various circuit elements are conventional and are identified with notations like those in FIG. 2, previously described. Therefore, the individual circuit elements will not be described in detail.

It should be noted that the input signal is supplied to a first section of the computational stage 24' to obtain the sums and differences of the real and imaginary parts of the input data as described in connection with equations 23-29. As was previously mentioned, only two data input channels are necessary for this sum and difference function. The sums and differences in the first section 70 are stored in a suitable memory 71 for the subsequent processing by second and third sections 72 and 74, respectively, of the computational stage.

The second section 72 of the computational stage 24' comprises a plurality of multiply/accumulator circuits and provides the products of the input signals, i.e., the cosines and sines and the sums of the real and imaginary parts of the input data, as was previously described in connection with equations 30-39. It will be noted that the second section 72 of the computational stage includes $N/4 + 1$ data channels identical in structure to those described in connection with the second section of the computational stage 24 of FIG. 2.

The output signal from the second section 72 is supplied to a suitable memory 73. The memory 73 then provides input data to the third section 74 of the computational stage.

The third section 74 of the computational stage includes four data channels identical to the data channels in the third section of the computational stage 24 of FIG. 2. Each of these data channels is a controllable add/subtract accumulator controlled by appropriate timing signals to perform the additions and subtractions of equations 40-48 previously described. By appropriate grouping of the data from the memory 73, only four data channels are necessary as was previously mentioned.

The control lines, $C_i$, (where $i = 1, 2, \ldots, 7 + N/4$) can have four functions as with the control lines of the previously described computational stage. These functions include adding the new input data, subtracting the new input data, ignoring the new input data and resetting the accumulator to start the next cycle.

The control lines $C_i$ may not in all cases require a subtraction control. For example, the control line $C_1$ is preferably controlling its associated adder to produce the $S^+{}_{0R}$ and $S^+{}_{0I}$ signals of equations 23 and 24. In any event, however, all of the accumulators require the ability to reset and ignore the input signals and thus controllable adders are employed in all instances.

Of course, as in connection with the computational stage of FIG. 2 there are numerous ways in which the adders, multipliers and accumulators may be implemented. The most desirable way will normally depend upon the availability of a given technology at the time of implementation as well as the speed and power considerations. For example, the multipliers require only a small number of multiplier constants and may be efficiently implemented as a look-up in a memory such as a PROM, particularly if speed is an important consideration.

III. SPECIFIC EXAMPLE OF A PROCESSOR ACCORDING TO THE PRESENT INVENTION

A specific example of the present invention for processing 120 data points (i.e., $N = 120$) is described hereinafter in connection with FIGS. 7-10 after briefly discussing the theoretical considerations. It should be understood that the 120 point DFT processor described hereinafter is only one example of a processor that might be used in practice for signal analysis such as in a radar system. Other implementations for other uses will be clearly apparent to one skilled in the art from the entirety of the description herein.

A. Theoretical Considerations

As was previously described, an N point processor may be implemented as a series of smaller point processors and various advantages can be obtained if the smaller point processors are arranged to process a number of points which are relatively prime in number. From the previous discussion, it can be seen that a particular frequency component for the 120 point DFT is given by the following equation:

$$A_k = \sum_{n=0}^{119} W_N^{kn} \tag{55}$$

For a 120 point DFT, the processing can clearly be accomplished by two smaller point processors of L and M points (see, e.g., FIG. 1 wherein $L_1$ and $L_2$ point processors are shown) where L and M are 15 and 8, for example. Accordingly, the above expression can be rewritten as follows:

$$A_k = A_{8r+s} = \sum_{i=0}^{14} (W^8)^{ri} \left[ W^{si} \sum_{m=0}^{7} a_{15m+i}(W^{15})^{sm} \right] \quad (56)$$

Since 15 and 8 are relatively prime numbers, the processor can be implemented without the Twiddle Factor multipliers previously discussed. Therefore, setting the exponent of equation (50) to zero with L=15 and M=8, and $0 \leq q < 8$, $0 \leq b < 15$, it will be noted that q equals 1 and b equals 2. Therefore, the input sequence $a_{15m+i}$ must be circularly rotated by "q i" or "i" positions. This can be accomplished by rotating the "W" multiplier by "$-i$" locations which in turn can be accomplished by factoring a $W^{15si}$ term from the inner summation of equation (56).

Equation (56) then becomes:

$$A_k = A_{8r+s} = \quad (57)$$
$$\sum_{i=0}^{14} (W^8)^{ri} \left[ W^{si} W^{15si} \sum_{m=0}^{7} a_{15m+i}(W^{15})^{s(m-i)} \right]$$

Replacing r with $(r_1 - 2s)$ mod 15, equation (57) becomes:

$$A_k = A_{8[r_1-2s] \text{ mod } 15]+s} = \sum_{i=0}^{14} (W^8)^{r_1 i} \sum_{m=0}^{7} a_{15m+i}(W^{15})^{s(m-i)} \quad (58)$$
with $r_1 = 0,1,2,\ldots,14$
$s = 0,1,2,\ldots,7$ All of the coefficients $A_k$ are computed by letting $r_1$ and s take on all their possible values.

Letting $G(s) = \sum_{m=0}^{7} a_{15m+i}(W^{15})^{s(m-i)}$ equation (58) becomes:

$$A_k = A_{8[(r_1-2s) \text{ mod } 15]+s} = \sum_{i=0}^{14} G(s)(W^8)^{r_1 i} \quad (59)$$

However, since $15 = 3 \times 5$, the transform represented by equation (59) can be decomposed such that:

$r_i = 5l + p$ $l = 0,1,2$ $p = 0,1,2,3,4$

Then $$A_k = A_{8[(5l+p-2s) \text{ mod } 15]+s} = \quad (60)$$
$$\sum_{j=0}^{2} (W^{40})^{lj} \left[ (W^8)^{pj} \sum_{v=0}^{4} G^{(s)}_{3v+j}(W^{24})^{pv} \right]$$

Since 3 and 5 are relatively prime with respect to each other and with respect to 8, the Twiddle Factors can also be eliminated. Setting the exponent in equation (50) equal to zero with L=3, M=5, and $0 \leq q < M$ and $0 \leq b < L$, one finds that q=3 and b=2. Therefore, the input sequence must be circularly rotated by "q j" or "3j" positions. This can be accomplished by rotating the "W" multiplier by "$-3j$" locations which in turn can be accomplished by factoring a $(W^8)^{9pj}$ term from the inner summation of equation (60). Equation (60) then becomes:

$$A_k = A_{8[(5l+p-2s) \text{ mod } 15]+s} = \quad (61)$$
$$\sum_{j=0}^{2} (W^{40})^{lj} [(W^8)^{pj}(W^8)^{9pj} \sum_{v=0}^{4} G^{(s)}_{3v+j}(s)(W^{24})^{p(v-3j)}]$$

Replacing l with $(l_1 - 3p)$ mod 3, equation (61) becomes:

$$A_k = A_t = \sum_{j=0}^{2} W^{40lj} \sum_{v=0}^{4} G^{(s)}_{3v+j} W^{24p(v-3j)} = \quad (62)$$
$$\sum_{j=0}^{2} H_j^{(p,s)} W^{40lj}$$

where $t = 8[[5[(l_1 - 2p) \text{ mod } 3] + p - 2s] \text{ mod } 15] + s \quad (63)$
$H_j^{(p,s)} = \sum_{v=0}^{4} G^{(s)}_{3v+j} W^{24p(v-3j)} \quad (64)$ The foregoing equations (55) to (64) indicate the following sequence of steps is required to generate the k-th frequency component of the 120 point DFT:

1. Circularly rotate the input sequence $a_{15m+i}$ by "i" positions, $i = 0,1,2,\ldots,14$;
2. Perform an 8 point computation (FIG. 6) on each of these rotated sequences $i = 0,1,2,\ldots,14$;
3. Circularly rotate the output of the 8 point computational stage, the sequence $G_{3v+j}^{(s)}$ by "3j" positions, $j = 0,1,2$ for each $s = 0,1,2,\ldots,7$;
4. Perform a 5 point computation (FIG. 2) on each of these rotated sequences $j = 0,1,2$ for each $s = 0,1,2,\ldots,7$;
5. Perform a 3 point computation (FIG. 2) on the output of the 5 point computational stage, the sequence $H_j^{(p,s)}$, $p = 0,1,2,3,4$ for each $s = 0,1,2,\ldots,7$; and
6. The output of the 3 point computational stage is then $A_t$ where t is defined in equation (63), and $A_t$ is the k-th frequency component $A_k$ of the 120 point DFT.

B. Implementation of 120 Point Processor According to the Invention

The 120 point processor described above mathematically, and the sequence of steps necessary to carry out the 120 point DFT analysis, can be implemented for a high data rate situation as indicated in block diagram form in FIGS. 7-12. This type of arrangement can be utilized for a variety of applications where a high rate of processing is required, e.g., Doppler radar, missile guidance systems, commercial aviation systems, sonar systems, etc.

In this regard, it should be noted that the arrangement may vary considerably depending upon the data rate and the speeds of the circuit technologies employed. Specifically, if the system is not required to operate at or near the speed limits of the technology employed, there need not be a computational stage dedicated to each small point transform. This is particularly true because of the modular nature of the embodiments illustrated. Thus, for low data rates, the computational stage may first be configured to perform a three point transform, then a five point transform, and then an eight point transform. For example, if the data rate is about the same as the limits of the technology used (e.g., about 6 MHz for TTL technology), then the 120 point processor may be implemented for the three and five point transforms in the hardware configuration of FIG.

Figure 7:
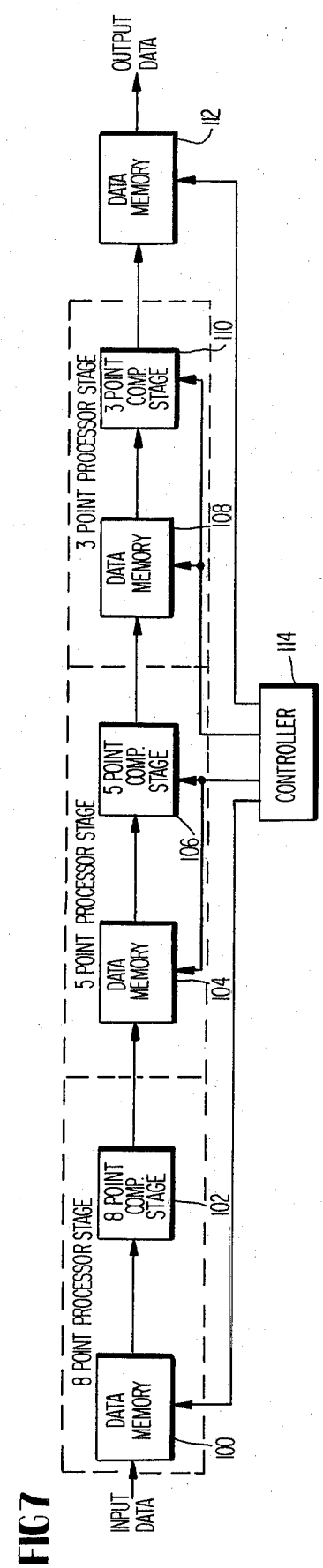
FIG. 7 is a functional block diagram of one embodiment of a 120 point processor according to the invention in which three L point processors of values 8, 5 and 3 are employed for processing of 120 points.

2 and the eight point transform in the hardware configuration of FIG. 6. This type of implementation is shown in FIG. 7. It should be noted, however, that these particular small point transforms of FIG. 7 can be reduced from the general cases shown in FIGS. 2 and 6 to more simplified hardware since, as will be appreciated, certain mathematical terms such as sums may be dropped from the computations with minor manipulations of the equations previously described. However, the manipulations of the data can always be accomplished by hardware configurations based on the multiply/accumulate and add/subtract accumulate basic building blocks.

In the high data rate applications, all of the basic add/subtract and multiply/accumulate blocks must operate all the time to satisfy the input data rate requirement. Thus, 17 add/subtract accumulates 2 multiply/accumulates and 2 multipliers are required in this case.

If the data rate is about 1/k of the data rate limits of the technology, where k=the number of small point factors that comprise, then only one of the small point transform configurations need be built in hardware and its configuration can be selectively modified by the controller to first perform an L point transform, then an M point transform, etc. Then hardware shown in FIG. 7 may be so configured to implement either a configuration like in FIG. 2 or in FIG. 6 depending on which of the k stages is being computed for the lower data rate, a reconfiguration of the stage by the controller and a recirculation of the data between the input and output memories and through the stage may be employed.

If the data rate is further reduced to $\frac{1}{3}$ k of the technology limits, then only a single array of multiply accumulators need be implemented. These blocks can be used to do the middle computations of FIGS. 2 and 6, as well as the input output computation, by using the multiplier to multiply by one during the add/subtract cycles. As the data rate further reduces, the required number of multiply/accumulators that must be implemented in hardware to perform the computational stages may eventually be reduced to only one.

For data rates above the chosen technology limits (about 6 MHz for TTL), such as the specific sample being addressed, two approaches may be taken. First, several processors such as in FIGS. 2 and 6 may be built and operated in parallel. Second a single step manipulation of small point transform equations leads to a parallel implementation of the equations rather than the serial one shown in FIGS. 2 and 6. Both of these solutions will be addressed here in the 120 point case as a specific example.

The specific example of the invention in FIGS. 7-12 operates at a 16 MHz data rate and employs 12 bit data words for each data point of interest. Other coding may be employed (e.g., 8 bit data words) but the 12 bit embodiment is preferred since it is most compatible with modern systems.

Referring now to FIG. 7, a data memory stage 100 receives digitized input data from a source which may vary with the particular application. The data memory 100, which is described in more detail hereinafter, is of sufficient size to store 240 input data points respectively forming the real and imaginary components of 120 complex input data points.

The input data sequence $A_{15m+i}$ is circularly rotated by "i" positions as will be more fully described hereinafter and is fed to an 8 point computational stage 102. An 8 point transform is performed on each rotated sequence for i=0, 1, 2, ..., 14 in stage 102 and the transformed values are stored in a data memory stage 104.

The data sequence $G_{3v+j}^{(s)}$ stored in the data memory stage 104 is circularly rotated by "3j" positions for j=0, 1, 2 for each s=0, 1, 2, ..., 7 as will be more fully described hereinafter, and is fed to a 5 point computational stage 106. A 5 point transform is performed on each of the rotated sequences j=0, 1, 2 for each s=0, 1, 2, ..., 7, and the transformed values stored in a data memory stage 108 in the next processor stage.

The data sequence $H_j^{(p,s)}$ stored in the data memory stage 108 is applied to a 3 point computational stage 110. A 3 point transform is performed on each sequence p=0, 1, 2, 3, 4, for s=0, 1, 2, ..., 7 and the output stored in a data memory stage 112.

The data sequence $A_k$ stored in the data memory stage 112d is the output of the processor which can be fed to other circuit components as output data.

The entire operation of the processor is controlled by a controller 114. The controller provides the control signals $C_i$, as previously described, in any suitable conventional manner. For example, the controller 114 may be a timing circuit of conventional design operating at the desired data rate in synchronism with (or controlling access to) the incoming data. Alternatively, a microprocessor and a suitable interface may be utilized to sequence the data through the processor. The rotation of the data described hereinafter in detail may be accomplished by a conventional technique of addressing the data memories in a predetermined sequence so that the output data from the memory can be fed to the next stage in any desired sequence.

1. The Data Memory Stages

FIG. 8 illustrates the data memory and computational stages of FIG. 7 in greater detail. The data memory stages 100, 104, 108, 112 of FIG. 7 each consist of a real part 100A, 104A, 108A, 112A, respectively, which store the real components of the complex data, and an imaginary part 100B, 104B, 108B, 112B, respectively, which store the imaginary components of the complex data. Each memory stage is further divided into two halves as more fully illustrated in FIG. 9 so that one half can be writing data out of it for the "$n^{th}$" data set while the other half is reading data into it for the "$n+1^{th}$" data set. These divisions of the data memory into two real and two imaginary parts reduces the data rate at which each data memory element must operate while maintaining a 16 MHz data rate for the overall data memory stage.

The data memory stages 100A and 100B are identical and share a common control and addressing scheme comprising two 9316 binary counters and four 512×4 PROM's described hereinafter in connection with FIG. 9. Each data memory 100A, 100B includes twelve (12) 256×4 RAM's (Random Access Memory) as configured in FIG. 9. It should be noted that this hardware and all hardware used herein is standard MIL-SPEC-TTL DIP hardware.

The control and addressing hardware shown in greater detail in FIG. 9 comprises two (2) 9316 binary counters and four (4) 512×4 PROM's (Programmable Read Only Memory) as configured in FIG. 9. As previously indicated, the input data is first reordered into a sequence of $a_{15m+i}$ subsets each of which contain 8 data words. The data memory stage 100A processes the real data bits and the data memory stage 100B processes the imaginary data bits. The data bits are then rotated to eliminate the Twiddle Factor multipliers. The reordering and rotation is preferably accomplished as a one step process. Both the reordering and rotation are accomplished through an addressing procedure that is controlled by a counter addressing a PROM as previously mentioned.

In the data memory stage 100A, the input data from the first data set is stored in a RAM114 and a RAM116 as it arrives via the input line. The sequence of operations for a pulse Doppler radar is as follows:

(a) $a_0$ from range cell 1 is stored in RAM114 location 0, (b) $a_0$ from range cell 2 is stored in RAM116 location 0, (c) $a_0$ from range cell 3 is stored in RAM114 location 1, (d) $a_0$ from range cell 4 is stored in RAM116 location 1,.

This process continues until all 120 real samples, $a_i$, from all 4 range cells are stored in RAM114 and RAM116 for the first data set.

Then the data from range cell 1 of the first data set is removed from RAM114 in the proper reordered and rotated format that groups sets of eight samples together as defined by the equations for the 120 point computational stage. The first group to be removed is $a_0, a_{15}, a_{30}, \ldots, a_{105}$. The second group to be removed is $a_1, a_{16}, a_{31}, \ldots, a_{106}$ and the final group to be removed for range cell 1 of data set 1 is $a_{14}, a_{29}, a_{44}, \ldots, a_{119}$. There are 15 of these sets of eight real numbers from range cell 1 of data set 1. Then the same sequences of the data from data set 1 range cells 2, 3 and 4 are removed from RAM116 and RAM114.

FIG. 9 shows the outputs of RAM's 114, 116, 118 and 120 all connected. The illustrated memory devices are preferably of the type that have "tri-state" outputs. This means that the output of any one of the RAM's 114-120 can be enabled to remove its data without being effected by the other three RAM's.

As the first set of 120 data points from data set one are removed from RAM114 a second set of data is being entered into the RAM118 and the RAM120 in the same manner is described above for data set 1 entering the RAM114 and RAM116. This data storage scheme is then repeated for all subsequent data sets. The odd numbered data sets enter the RAM114 and the RAM116 and the even numbered data sets enter the RAM118 and the RAM120.

Similarly, data set 2 is removed from the RAM118 and the RAM120 in the same order as data set 1 was removed from the RAM114 and the RAM116. At the same time, data set 3 is being stored in the RAM114 and the RAM116.

The reordering and rotation process is carried out by the RAM114, the RAM116, the RAM118 and the RAM120 controlled by a pair of counters 122 which address PROM's 124 and 126. The counters and the PROMs 124, 126 address the RAM 114, 116 and the RAM118, 120 such that the data is written in and read out in the proper sequence.

Referring once again to FIG. 8, the operation of the data memory 100B is identical to that of the data memory 100A just described, except that the data memory 100A processes the real components of the complex input data while the data memory 100B processes the imaginary components of the complex input data.

The data memory stages 104A, 104B, 108A, 108B, and 112A and 112B are essentially the same as the input data memory stages 100A and 100B respectively. One difference is that the RAM116 and the RAM120, the RAM116A and the RAM120A are not required. The reason for this change is that only one range cell at a time is processed through the computational hardware rather than four range cells. Therefore, less data memory is required between the small point stages because only one range cell of data must be stored. The input and output sequencing for data memory stages 104A, 108A, 112A are similar to that for data memory stage 100A except that a data set only has one range cell of data rather than four. Actual order of the samples will be as previously described in connection with the foregoing equations. The input and output sequencing for data memory stages 104B, 108B and 112B are similar to that of respective data memory stages 104A, 108A, and 112A except that they store the imaginary data.

In addition to the foregoing, each computational stage is provided with an input register and an output register as an interface between the computational stage and the memories. Thus, in FIG. 8 the eight point computational stage 102 has an input register 128 and an output register 130. The computational stage 106 has an input register 132 and an output register 134, and the stage 110 has associated input register 136 and output register 138.

2. The Input and Output Registers of the Computational Stages

As was peviously mentioned, each computation stage has an associated input memory or register to synchronize date being fed to the processor stage by the preceeding data memory stage and to set-up a full compliment of data for the computational stage to transform. Each computational stage also has an output memory or register to synchronize the data being fed to the subsequent data memory stage from the computational stage.

FIGS. 10A and 10B respectively illustrate in more detail one embodiment of an input register stage 128 which is the input memory for the 8 point computational stage 102, and one embodiment of an output register stage 138 which is the output memory for the 3 point stage 110.

Referring now to FIG. 10A, data flows from data memory 100A to a conventional, serially loaded register 140 and from data memory 100B to a conventional, serially loaded register 142. For the specific example, the individual data words enter the serial register 140 or serial register 142 at an 8 MHz rate. Therefore a new set of data is present in the serial registers at a 1 MHz rate.

When serially loaded, the serially loaded registers contain eight, 12 bit words which have been serially shifted into eight stages of twelve bit shift registers (8 twelve bit serial shift registers). The data words (12 bits) in serial registers 140 are read in parallel to 8 conventional twelve bit parallel loaded registers 144 and the words in serial register 142 are read in parallel to eight conventional twelve bit parallel loaded registers 146. The outputs signals from the parallel loaded registers 144 and 146 are tri-state and can thus be multiplexed to the 8 point computational stage by connecting the outputs together and controlling the output enable lines of the registers. Thus each set of eight words is on the input to the 8 point stage 102 for 500 nsec. This represents a 2 MHz rate of change of 8 input samples to the 8 point stage.

The operation of the input register 132 for the 5 point computational stage 106 and of the input register 136 for the 3 point stage 110 is identical to the operation of input register 118 for the eight point transform except there is less hardware required because there are only 5 and 3 twelve bit input words required respectively. This reduces the time to obtain a new data set in the serial registers and thus the time that the data is available in parallel to the 5 and 3 point stages.

FIG. 10B illustrates a mechanization of the output register stage 138 for the 3 point stage 110. Every three clock periods a new set of 3 data words has been computed by the 3 point stage 110 and is loaded into the output registers shown in FIG. 10B. The corresponding output bits of these three tri-state registers are tied together and multiplexed at the clock rate to the data memory 112A during the time that the 3 point stage is computing a new set of data outputs. A similar register is provided for the memory 112B.

The operation of output register 130 for the 8 point stage and of output register 134 for the 5 point stage is identical except that there are 8 and 5 data registers required, respectively, and the new data sets are computed every 8 and 5 clock cycles respectively.

There is also a set of registers such as in FIG. 10B for the imaginary words that are computed by the 8, 5 and 3 point stages. These feed into data memory 104B, 108B and 112B respectively. Therefore the data rate out of the output register hardware is at the required 8 MHz rate in both the real and imaginary channels.

3. The Computational Stages For the 120 Point Processor

The computational stages 102, 106 and 110 of FIGS. 7 and 8 are preferably parallel configuration implementations, i.e., computations are done in parallel as in the generalized forms of the processor stages previously described, because a parallel configuration is the most efficient configuration for very high data rate small number transforms. The high efficiency of the parallel configuration arises because only a constant (i.e., fixed value) intrastate multiplier is needed for both the real and the imaginary data. Therefore a PROM can be effectively utilized to perform this constant multiplication.

The data flow for the 3 point, 5 point and 8 point transforms is illustrated in the flow graphs of FIGS. 11A, 11B and 11C respectively. One embodiment of the hardware to implement the 3, 5 and 8 point stages is illustrated in FIGS. 12A, 12B and 12C respectively. It will be seen that in the illustrated embodiments, the 3 point stage requires 18 adders, 4 inverters, 12 2048×4 PROMs, 9 (1×8) registers, and 1-9316 counter; the 5 point stage requires 51 adders, 12 inverters, 30 2048×4 PROMs, 18 (1×8) registers, and 1-9316 counter; the 8 point stage requires 81 adders, 26 inverters, 12 2048×4 PROMs, 24 (1×8) registers, and 1-9316 counter.

(a) Three Point Stage

Decomposition of the 3 point transform according to the present invention yields the following computational steps:

(1) compute and store  $a_{1R} + a_{2R} = S_{1R}^+$
$a_{1R} - a_{2R} = S_{1R}^-$
(2) compute and store  $a_{1I} + a_{2I} = S_{1I}^+$
$a_{1I} - a_{2I} = S_{1I}^-$
(3) compute and store  $a_{1R} + a_{2R} + a_{0R} = S_{0R}^+$
(4) compute and store  $a_{1I} + a_{2I} + a_{0I} = S_{0I}^+$
(5) compute:
$$T_{1R} = S_{1R}^+ \left( \cos \frac{2\pi}{3} - 1 \right)$$
$$T_{1I} = S_{1R}^- \left( \sin \frac{2\pi}{3} \right)$$

-continued $$U_{1R} = S_{1I}^- \left( \sin \frac{2\pi}{3} \right)$$

$$U_{1I} = S_{1I}^+ \left( \cos \frac{2\pi}{3} - 1 \right)$$

(6) compute:
$A_{0R} = S_{0R}^+ \ A_{0I} = S_{0I}^+$
$A_{1R} = T_{1R} + S_{0R}^+ + U_{1R}$
$A_{1I} = -T_{1I} + S_{0R}^+ + U_{1I}$
$A_{2R} = T_{1R} + S_{0R}^+ - U_{1R}$
$A_{2I} = T_{1I} + S_{0I}^+ + U_{1I}$ The flow graph of FIG. 11A illustrates a technique for implementing these six steps. The terms in parentheses in FIG. 11A represent the signals that appear at particular nodes in terms of the computational steps. It will be seen that one implementation of this flow graph requires a memory and multiplexer at the nodes just after the multipliers, because the data must be reversed before going through the output adds.

With reference to the embodiment of the 3 point stage illustrated in FIGS. 11A and 12A, the data word $a_0$ contains a real component $a_{0R}$ and an imaginary component $a_{0I}$. Similarly, the data word $a_1$ contains a real component $a_{1R}$ and an imaginary component $a_{1I}$, and the data word $a_2$ contains a real component $a_{2R}$ and an imaginary component $a_{2I}$. Each component is represented by a multi-bia data word (12 bits in this embodiment).

Simultaneously, either all the real or all the imaginary data bits (but not both at the same time) of the data words $a_0$, $a_1$ and $a_2$ are supplied from a data source. The data component of data word $a_0$ is applied to an adder 150 and the component of data word $a_1$ is applied to an adder 152 and an adder 154. The component of the data word $a_2$ is applied to the second input terminal of the of the adder 152 and through an inverter 156 to the adder 154.

The output signal from the adder 152 is applied to the second input terminal of the adder 150 and the output signal from the adder 150 is applied to a register pair 158 (one for real and one for imaginary components). The output signal from the adder 152 is also supplied to PROMs 160 and the output signals from the PROMs are provided to a register pair 162 (one for real and one for imaginary components). A constant 1 is supplied to the adder 154 and the output of the adder 154 is then fed to a set of PROMs 164 and then a register pair 166 (one for real and one for imaginary components).

The output signals of the register pair 158 are provided as the $A_0$ output signal and are applied to an adder 168. The output signals from the register pair 162 are supplied to the adder 168 and the output signal from the adder 168 is supplied to an adder 170 and to an adder 172. The output signal from the register pair 166, under the control of a counter 174, is supplied to the adder 170 and through an inverter 176 to the adder 172 (which also receives a constant 1 for addition to the sum). The adder 170 output signal is the $A_1$ output signal and the adder 172 output is the $A_2$ output signal.

With continued reference to FIG. 12A, first the real components $a_{0R}$, $a_{1R}$ and $a_{2R}$ are processed, then the imaginary components $a_{0I}$, $a_{1I}$ and $a_{2I}$ are processed. The adders are conventional in operation and sum the applied signals. The PROMs are arranged to multiply the input data by constant multipliers (the sine and cosine functions) and the inverters merely invert the data to change its sign. Therefore the register pair 166, preferably a tri-state register, is controlled by the counter 174 is required to read out first the real and then the imaginary data.

First the real components of the data words are processed and stored in the registers 158, 162 and 166. Then the imaginary components of the data are processed and the imaginary and real data resulting therefrom stored in the registers 158, 162 and 166. When both the real and the imaginary components have thus been processed and stored in the registers, then the real data is read out of the registers and further processed through the adders as illustrated to provide the real component of the $A_0$, $A_1$ and $A_2$ signals. Then the imaginary data is read out of the registers 158, 162 and 166 and processed in the same manner to provide the imaginary components of the $A_0$, $A_1$ and $A_2$ signals.

(b) Five and Eight Point Stages

The 5 point and 8 point stages illustrated in FIGS. 11B, 12B and 11C, 12C respectively, process the data in a similar manner as heretofore described in connection with the 3 point mechanization illustrated in FIGS. 11A, 12A. Since more data is being processed in a parallel mode in the 5 point and 8 point mechanizations than in the 3 point mechanization, more hardware is needed and more additions and multiplications take place. However, the terminology is the same and the processing scheme is the same as that already described with reference to the 3 point mechanization and therefore it will not be described in detail. However, the decomposition equations are provided hereinafter to facilitate an understanding of FIGS. 11B, 11C, 12B and 12C.

Decomposition of the 5 point transform yields the following computational steps:

(1) compute and store:
$$a_{1R} + a_{4R} = S_{1R}^+, \ S_{1R}^- = a_{1R} - a_{4R}$$
$$S_{2R}^+ = a_{2R} + a_{3R}, \ S_{2R}^- = a_{2R} - a_{3R}$$
$$S_{1I}^+ = a_{1I} + a_{4I}, \ S_{1I}^- = a_{1I} - a_{4I}$$
$$S_{2I}^+ = a_{2I} + a_{3I}, \ S_{2I}^- = a_{2I} - a_{3I}$$
$$S_{0R}^+ = a_{0R} + a_{1R} + a_{2R} + a_{3R} + a_{4R}$$
$$S_{0I}^+ = a_{0I} + a_{1I} + a_{2I} + a_{3I} + a_{4I}$$

(2) compute and store:
$$T_{iR} = S_{1R}^+\left(\cos\frac{2\pi}{5} - 1\right) + S_{0R}^+ +$$
$$S_{2R}^+\left(\cos\frac{4\pi}{5} - 1\right)$$

$$T_{2R} = S_{1R}^+\left(\cos\frac{4\pi}{5} - 1\right) + S_{0R}^+ +$$
$$S_{2R}^+\left(\cos\frac{2\pi}{5} - 1\right)$$

$$T_{1I} = S_{1R}^-\sin\frac{2\pi}{5} +$$
$$S_{2R}^-\sin\frac{4\pi}{5}$$

$$T_{2I} = S_{1R}^-\sin\frac{4\pi}{5} -$$
$$S_{2R}^-\sin\frac{2\pi}{5}$$

$$U_{1R} = S_{1I}^-\sin\frac{2\pi}{5} +$$
$$S_{2I}^-\sin\frac{4\pi}{5}$$

$$U_{2R} = S_{1I}^-\sin\frac{4\pi}{5} - S_{2I}^-\sin\frac{2\pi}{5}$$

$$U_{1I} = S_{1I}^+\left(\cos\frac{2\pi}{5} - 1\right) +$$
$$S_{2I}^+\left(\cos\frac{4\pi}{5} - 1\right) + S_{0I}^+$$

$$U_{2I} = S_{1I}^+\left(\cos\frac{4\pi}{5} - 1\right) +$$
$$S_{2I}^+\left(\cos\frac{2\pi}{5} - 1\right) + S_{0I}^+$$

(3) compute:
$$A_{0R} = S_{0R}^+, \ A_{0I} = S_{0I}^+$$
$$A_{1R} = T_{1R} + U_{1R}, \ A_{1I} = -T_{1I} + U_{1I}$$
$$A_{2R} = T_{2R} + U_{2R}, \ A_{2I} = -T_{2I} + U_{2I}$$
$$A_{3R} = T_{2R} - U_{2R}, \ A_{3I} = T_{2I} + U_{2I}$$
$$A_{4R} = T_{1R} - U_{1R}, \ A_{4I} = T_{1I} + U_{1I}$$

Step 1 of this decomposition can be drawn in flow graph form as a set of butterfly adds like the three point input adds of FIG. 11A. However, an observation about the computations in step 2 may be made before proceeding. The equations in step 2 may be rewritten as Step $(2^1)$:

$$T_{1R} = S_{0R}^+ + (S_{1R}^+ + S_{2R}^+)\left(\frac{\cos\frac{2\pi}{5} + \cos\frac{4\pi}{5}}{2} - 1\right) +$$
$$(S_{1R}^+ - S_{2R}^+)\left(\frac{\cos\frac{2\pi}{5} - \cos\frac{4\pi}{5}}{2}\right)$$

$$T_{2R} = S_{0R}^+ + (S_{1R}^+ + S_{2R}^+)\left(\frac{\cos\frac{2\pi}{5} + \cos\frac{4\pi}{5}}{2} - 1\right) -$$
$$(S_{1R}^+ - S_{2R}^+)\left(\frac{\cos\frac{2\pi}{5} - \cos\frac{4\pi}{5}}{2}\right)$$

$$U_{1I} = S_{0I}^+ + (S_{1I}^+ + S_{2I}^+)\left(\frac{\cos\frac{2\pi}{5} + \cos\frac{4\pi}{5}}{2} - 1\right) +$$
$$(S_{1I}^+ - S_{2I}^+)\left(\frac{\cos\frac{2\pi}{5} - \cos\frac{4\pi}{5}}{2}\right)$$

$$U_{2I} = S_{0I}^+ + (S_{1I}^+ + S_{2I}^+)\left(\frac{\cos\frac{2\pi}{5} + \cos\frac{4\pi}{5}}{2} - 1\right) -$$
$$(S_{1I}^+ - S_{2I}^+)\left(\frac{\cos\frac{2\pi}{5} - \cos\frac{4\pi}{5}}{2}\right)$$

$$T_{1I} = (S_{1R}^- + S_{2R}^-)\sin\frac{4\pi}{5} + (S_{1R}^-)\left(\sin\frac{2\pi}{5} - \sin\frac{4\pi}{5}\right)$$

$$T_{2I} = (S_{1R}^- + S_{2R}^-)\sin\frac{4\pi}{5} - (S_{2R}^-)\left(\sin\frac{2\pi}{5} + \sin\frac{4\pi}{5}\right)$$

$$U_{1R} = (S_{1I}^- + S_{2I}^-)\sin\frac{4\pi}{5} + (S_{1I}^-)\left(\sin\frac{2\pi}{5} - \sin\frac{4\pi}{5}\right)$$

$$U_{2R} = (S_{1I}^- + S_{2I}^-)\sin\frac{4\pi}{5} - (S_{2I}^-)\left(\sin\frac{2\pi}{5} + \sin\frac{4\pi}{5}\right)$$

Then steps (1), $(2^1)$ and (3) suggest a flow graph as shown in FIG. 11B and an implementation shown schematically in FIG. 12B. It will be appreciated that the flow graph of FIG. 11B is a special case of the generalized computational stage and additionally it should be clear that there are many other arrangements of this flow graph that can be obtained in accordance with the invention.

Decomposition of the 8 point transform yields the following computational steps:

(1) compute:
$$S^+_{0R} + S^+_{2R} = a_{0R} + a_{4R} + a_{2R} + a_{6R}$$
$$S^+_{0R} - S^+_{2R} = a_{0R} + a_{4R} - a_{2R} - a_{6R}$$
$$S^-_{0R} = a_{0R} - a_{4R}$$
$$S^-_{2R} = a_{2R} - a_{6R}$$
$$S^+_{0I} + S^+_{2I} = a_{0I} + a_{4I} + a_{2I} + a_{6I}$$
$$S^+_{0I} - S^+_{2I} = 0_I + a_{4I} - a_{2I} - a_{6I}$$
$$S^-_{0I} = a_{0I} - a_{4I}$$
$$S^-_{2I} = a_{2I} - a_{6I}$$
$$S^+_{1R} + S^+_{3R} = a_{1R} + a_{7R} + a_{3R} + a_{5R}$$
$$S^+_{1R} - S^+_{3R} = a_{1R} + a_{7R} - a_{3R} - a_{5R}$$
$$S^-_{1R} + S^-_{3R} = a_{1R} - a_{7R} + a_{3R} - a_{5R}$$
$$S^-_{1R} - S^-_{3R} = a_{1R} - a_{7R} - a_{3R} + a_{5R}$$
$$S^+_{1I} + S^+_{3I} = a_{1I} + a_{7I} + a_{3I} + a_{5I}$$
$$S^+_{1I} - S^+_{3I} = a_{1I} + a_{7I} - a_{3I} - a_{5I}$$
$$S^-_{1I} + S^-_{3I} = a_{1I} - a_{7I} + a_{3I} - a_{5I}$$
$$S^-_{1I} - S^-_{3I} = a_{1I} - a_{7I} - a_{3I} + a_{5I}$$

(2) compute:
$$T^E_{0R} = (S^+_{0R} + S^+_{2R}) \cdot 1$$
$$T^\circ_{0R} = (S^+_{1R} + S^+_{3R}) \cdot 1$$

$$T^E_{1R} = (S^-_{0R}) \cdot 1$$
$$T^\circ_{1R} = (S^+_{1R} - S^+_{3R}) \cos \frac{2\pi}{8}$$
$$U^E_{1R} = (S^-_{2I}) \cdot 1$$
$$U^\circ_{1R} = (S^-_{1I} + S^-_{3I}) \sin \frac{2\pi}{8}$$
$$T^E_{2R} = (S^+_{0R} - S^+_{2R}) \cdot 1$$
$$U^\circ_{2R} = (S^-_{1I} - S^-_{3I}) \cdot 1$$

$$U^E_{0I} = (S^+_{0I} + S^+_{2I}) \cdot 1$$

$$U^\circ_{0I} = (S^+_{1I} + S^+_{3I}) \cdot 1$$

$$U^E_{0I} = (S^-_{0I}) \cdot 1$$

$$U^\circ_{1I} = (S^+_{1I} - S^+_{3I}) \cos \frac{2\pi}{8}$$
$$T^E_{1I} = (S^-_{2R}) \cdot 1$$
$$T^\circ_{1R} + S^-_{1R} + S^-_{3R}) \sin \frac{2\pi}{8}$$
$$U^E_{2I} = (S^+_{0I} - S^+_{2I}) \cdot 1$$
$$T^\circ_{2I} = (S^-_{1R} - S^-_{3R}) \cdot 1$$

(3) compute:
$$A_{0R} = T^E_{0R} + T^\circ_{0R}$$
$$A_{4R} = T^E_{0R} - T^\circ_{0R}$$
$$A_{1R} = T^E_{1R} + U^E_{1R} + T^\circ_{1R} + U^\circ_{1R}$$
$$A_{3R} = T^E_{1R} - T^\circ_{1R} + U^\circ_{1R} - U^E_{1R}$$
$$A_{7R} = T^E_{1R} - U^E_{1R} + T^\circ_{1R} - U^\circ_{1R}$$
$$A_{5R} = T^E_{1R} - T^\circ_{1R} - U^\circ_{1R} + U^E_{1R}$$
$$A_{2R} = T^E_{2R} + U^\circ_{2R}$$
$$A_{6R} = T^E_{2R} - U^\circ_{2R}$$
$$A_{0I} = U^E_{0I} + U^\circ_{0I}$$
$$A_{4I} = U^E_{0I} - U^\circ_{0I}$$
$$A_{1I} = U^E_{1I} + U^\circ_{1I} - T^E_{1I} - T^\circ_{1I}$$
$$A_{3I} = U^E_{1I} - U^\circ_{1I} + T^E_{1I} - T^\circ_{1I}$$
$$A_{7I} = U^E_{1I} + U^\circ_{1I} + T^E_{1I} + T^\circ_{1I}$$
$$A_{5I} = U^E_{1I} - U^\circ_{1I} - T^E_{1I} + T^\circ_{1I}$$
$$A_{2I} = U^E_{2I} - T^\circ_{2I}$$
$$A_{6I} = U^E_{2I} + T^\circ_{2I}$$

These three steps can be drawn directly in flow graph form for parallel computation of the 8 point transform as shown in FIG. 11C and can be implemented as shown in FIG. 12C.

The discussion above clearly indicates that the decomposition and computations can be performed with parallel small point transforms. Therefore the present invention may be very effectively used for very high data rate processing problems.

D. Timing Operation of the Specific 120 Point Example

With reference to FIG. 8, certain nodes of the block diagram are labeled A, B, C, D, E, F, G, and H. The data flowing through the 120-point processor as a function of time, and thus appearing at the lettered nodes at a particular point in time, are given in the Table 1 below. The data $a_k$, $A_i$, $G_i^{(s)}$ and $H_j^{(p,s)}$ are as previously defined; the subscript REAL denotes a real data word in contrast to an imaginary data word, and the subscripts RC1, RC2, RC3 and RC4 denote the source of the data as range cell 1, range cell 2, range cell 3 and range cell 4, respectively. Time is denoted in units of 100 nanoseconds.

TABLE 1

| Node A | | Node B | |
|---|---|---|---|
| Time | Data | Time | Data |
| 0 | zero | 480 | zero |
| 1 | $a_0$,RC1, REAL | 481 | $a_0$,RC1,REAL |
| 2 | $a_0$,RC2, REAL | 482 | $a_{15}$,RC1,REAL |
| 3 | $a_0$,RC3, REAL | 483 | $a_{30}$,RC1, REAL |
| 4 | $a_0$,RC4, REAL | 484 | $a_{45}$,RC1, REAL |
| 5 | zero | 485 | $a_{60}$,RC1,REAL |
| 6 | $a_1$,RC1, REAL | 486 | $a_{75}$,RC1,REAL |
| 7 | $a_1$,RC2, REAL | 487 | $a_{90}$,RC1,REAL |
| 8 | $a_1$,RC3, REAL | 488 | $a_{105}$,RC1,REAL |
| 9 | $a_1$,RC4 | 489 | zero |
| 10 | zero | | |
| Node C | | Node D | |
| Time | Data | Time | Data |
| 501 | $G_0^{(o)}$,RC1,REAL | 621 | $G_0^{(o)}$,RC1,REAL |
| 502 | $G_0^{(1)}$,RC1,REAL | 622 | $G_3^{(o)}$,RC1,REAL |
| 503 | $G_0^{(2)}$,RC1,REAL | 623 | $G_6^{(o)}$,RC1,REAL |
| 504 | $G_0^{(3)}$,RC1,REAL | 624 | $G_9^{(o)}$,RC1,REAL |
| 505 | $G_0^{(4)}$,RC1,REAL | 625 | $G_{12}^{(o)}$,RC1,REAL |
| 506 | $G_0^{(5)}$,RC1,REAL | | |
| 507 | $G_0^{(6)}$,RC1,REAL | | |
| 508 | $G_0^{(7)}$,RC1,REAL | | |
| Node E | | Node F | |
| Time | Data | Time | Data |
| 631 | $H_0^{(0,0)}$, RC1, REAL | 751 | $H_0^{(0,0)}$, RC1, REAL |
| 632 | $H_0^{(1,0)}$, RC1, REAL | 752 | $H_1^{(0,0)}$, RC1, REAL |
| 633 | $H_0^{(2,0)}$, RC1, REAL | 753 | $H_2^{(0,0)}$, RC1, REAL |
| 634 | $H_0^{(3,0)}$, RC1, REAL | | |
| 635 | $H_0^{(4,0)}$, RC1, REAL | | |
| Node G | | Node H | |
| Time | Data | Time | Data |
| 757 | $A_0$, RC1, REAL | 877 | $A_0$, RC1, REAL |
| 758 | $A_{40}$, RC1, REAL | 878 | $A_1$, RC1, REAL |
| 759 | $A_{80}$, RC1, REAL | 879 | $A_2$, RC1, REAL |

It should be noted that the 877 time value for $A_0$ in Table 1 refers to the time delay from the input of the processor to the output of the processor and not how rapidly the next set of data samples comes to the processor, (i.e., how long it takes before the input data comes out of the other end of the processor and not how fast the input data is entering the processor).

E. Alternative Hardware Implementations of the 120 Point Example

The foregoing example illustrates a parallel form of the present invention for a high data rate problem in a relatively simple, clear manner. However, the 120 point processor may be implemented in various other ways in accordance with the invention. The circuit elements could be further reduced. For example, the internal registers in the computational stages could be implemented as 16×4 RAMs. Similarly, the input/output data registers can be configured using 16×4 RAMs rather than 54L5374(1×8) and so forth.

For example, Table 2 below indicates the types and amounts of circuit components employed in the 120 point processor described in connection with FIGS. 7-12.

TABLE 2

| Part | Data Memory | | | I/O Registers | | | Comp. State | | | Total |
|---|---|---|---|---|---|---|---|---|---|---|
| | 8pt. | 5pt. | 3pt. | 8pt. | 5pt. | 3pt. | 8pt. | 5pt. | 3pt. | |
| Adders | | | | | | | 81 | 51 | 18 | 150 |
| Inverters | | | | 4 | 3 | 2 | 27 | 12 | 4 | 52 |
| PROM (512 × 4) | 4 | 4 | | | | | | | | 8 |
| PROM (2048 × 4) | | | | | | | 14 | 34 | 13 | 61 |
| RAM (256 × 4) | 24 | 24 | | | | | | | | 48 |
| Registers (1 × 8) | | | | 75 | 48 | 28 | 30 | 23 | 12 | 216 |
| Counters | 2 | 2 | | | | | | | | 4 |
| | | | | | | | | | | 539 |

It will be noted that certain memory and register changes noted above with a reduction in integrated circuit elements from the 539 shown above in Table 2 to a total of 490.

Moreover, the parallel 120 point processor previously described is capable of operation at up to a 24 MHz real data rate although it need only operate at up to a 16 MHz read data rate in the exemplary radar application. This speed potential is therefore under utilized in the example and other techniques such as the serial techniques previously discussed in connection with FIGS. 2-6 may be utilized.

In this regard, several serial processors capable of operating at the same rate as a conventional FFT (e.g., 12 MHz) may be used to process data at the high data rate. Therefore, two such processors operating in parallel would be required.

Such a serial implementation would receive the input data serially as shown in FIG. 2, for example. The input registers associated with each processor stage would vary according to the form of the input data to the serial computational stages and, in fact, these registers would be quite simple in relation to those previously illustrated since the data is being processed sequentially. Moreover, output registers would not be required because the computational stages themselves multiplex the output data in a form suitable for direct application to the data memories.

Thus, the serial implementation would be similar to that shown in FIG. 8 but with the serial computational stages of FIGS. 2-6 and without the output registers 130, 134 and 138. The input registers would be simple buffer registers rather than the serial/parallel data arrangements previously described. The total number of components for two of these processors utilizing this approach would thus be:

TABLE 3

| Parts | Data Memory | | | I/O Registers | | | Comp. State | | | Total |
|---|---|---|---|---|---|---|---|---|---|---|
| | 8pt. | 5pt. | 3pt. | 8pt. | 5pt. | 3pt. | 8pt. | 5pt. | 3pt. | |
| 1024 × 4 PROM | | | | | | | 54 | 48 | 28 | 130 |
| 1 × 8 Register | | | | 4 | 4 | 4 | 80 | 80 | 48 | 220 |
| 16 × 4 RAM | | | | | | | 6 | 12 | 6 | 24 |
| 32 × 8 PROM | | | | | | | 6 | 8 | 4 | 18 |
| 2048 × 4 PROM | | | | | | | 20 | 28 | 20 | 68 |
| CTRS | 2 | 2 | | | | | 6 | 6 | 4 | 20 |
| 256 × 4 RAM | 24 | 24 | | | | | | | | 48 |
| 512 × 4 PROM | 4 | 4 | | | | | | | | 8 |
| | | | | | | | | | | 536 |

IV. COMPARISON OF THE PRESENT PROCESSOR WITH THE STATE OF THE ART FFT PROCESSOR

An FFT processor of nearly the same data point processing capabilites (128 point as opposed to 120) and believed representative of the state of the art and using a real followed by an imaginary sequential configuration to reduce the required hardware is illustrated in FIGS. 13A-13C.

FIG. 13A illustrates the FFT processor in block diagram form. FIG. 13B illustrates the first and second FFT processor stages and FIG. 13C illustrates the subsequent processor stages 3-7 in greater detail.

The multipliers shown in FIGS. 13B-13C can be configured as an array of 2×4 multipliers or a multiplexed pair of 12×12 multipliers if the hardware constraint is MIL-SPEC available TTL parts and a 6 MHz data rate. The FFT can operate at a complex data rate of about 6 MHz with the illustrated configuration. However, the problem is set up as four range cells each requiring a 4 MHz real processor. Since range cell data cannot be conveniently split between processors it is necessary to use one FFT for each pair of range cells.

Therefore the amount of hardware required for the 128 point FFT to solve the 6 MHz real data rate problem is shown in Table 4.

TABLE 4

| Part | Stages | | | | | | Total |
|---|---|---|---|---|---|---|---|
| | 1 & 2 | 3 | 4 | 5 | 6 | 7 | |
| 12 × 12 multiplier | 0 | 96 | 96 | 96 | 96 | 96 | 480 |
| 256 × 4 RAM | 24 | 24 | 24 | 24 | 24 | 24 | 144 |
| 256 × 4 PROM | 0 | 24 | 24 | 24 | 24 | 24 | 120 |
| 1 × 8 Register | 50 | 64 | 64 | 64 | 64 | 64 | 370 |
| 4 BIT Counter | 14 | 22 | 22 | 22 | 22 | 22 | 124 |
| 4 BIT adder | 24 | 18 | 18 | 18 | 18 | 18 | 114 |
| 2:1 multiplexer | 18 | 18 | 18 | 18 | 18 | 18 | 108 |
| Inverters | 8 | 4 | 4 | 4 | 4 | 4 | 28 |
| | | | | | | | 1488 |

This FFT design is based on the use of a 64 pin 12×12 multiplier chip and a 256×4 RAM chip that is a nonstandard width. Both of these represent significant technical risk as well as underlying life cycle cost disadvantages. There are standard parts that can replace them that are 24 pins or less and fit into standard socket configuration. However, these alterations (256×1 RAM, 2×4 multiplier) leads to an increased parts count of about 450 chips.

Table 5 below provides a chip area comparison of several processor mechanizations of the present invention relative to the 128 point FFT. The comparison is shown with and without the 256×4 RAM and the 12×12 multiplier.

TABLE 5

| Transform Size | Swift Chips | Improvement Over 1488 Chip | Improvement Over 1940 Chip |
| --- | --- | --- | --- |
| 117 | 513 | 2.90/1 | 3.78/1 |
| 120 | 536 | 2.78/1 | 3.62/1 |
| 126 | 526 | 2.83/1 | 3.69/1 |
| 130 | 546 | 2.73/1 | 3.55/1 |
| 132 | 566 | 2.63/1 | 3.43/1 |
| 136 | 523 | 2.85/1 | 3/71/1 |

When the foregoing table of components for the FFT processor is compared to the table of components required for the processor according to the present invention, it can be readily seen that the present processor requires less than 2/5 of the hardware (in equivalent chips) of the FFT approach.

Further, since the FFT approach requires N to be a power of 2, only ten such N-point processors can be implemented by the FFT approach for N up to 1024. However, with the approach of the subject invention, all integer transform lengths are available. Table 5 illustrated several of the most efficient SWIFT choices in the vicinity of 128 points.

Modifications and variations of the present invention are possible in light of the above teachings. It is therefore to be understood that within the scope of the appended claims the invention may be practiced otherwise than as specifically described, and that all the matter contained in the above description and shown in the accompanying drawings shall be construed as illustrative and not in a limiting sense.

What is claimed is:

1. A processor for processing input data comprising N discrete samples $a_i (i=0,1,2,\ldots,N-1)$ of a quantized time domain signal having real components $a_{iR}$ and imaginary components $a_{iI}$ in order to determine the frequency content thereof, said processor having a computational stage comprising:

means connected to receive signals representing the real and imaginary components for calculating sums and differences of the real components of the input data and for calculating sums and differences of the imaginary components of the input data;

first data storage means for storing said sums and differences of the real and imaginary components of the input data and for retrieving the stored sums and differences of the real and imaginary components in a first predetermined order;

means connected to receive said retrieved sums and differences of the real and imaginary components, in said first predetermined order, for multiplying the retrieved sums and differences by predetermined constant values and for summing the products with at least some of the retrieved sums and differences to produce partial sums of the real and imaginary components;

second data storage means for storing the partial sums as they are produced and for retrieving the stored partial sums in accordance with a second predetermined order of retrieval in order to separately retrieve the partial sums of the real and imaginary components, respectively; and means for calculating the sums and differences of the partial sums of the real components and the imaginary components of the data retrieved from said second storage means to produce real and imaginary output data representating the frequency content of the time domain signal.

2. The processor of claim 1:
wherein the N discrete samples are processed by L and M points transforms, where L and M are relatively prime numbers having a product equal to N;
wherein said computational stage is an M-point computational stage; and
wherein said processor further comprises:
an L-point computational stage; and
third data storage means for receiving output data from said L-point computational stage and for supplying the real and the imaginary components of the quantized time domain signal to the means for calculating the sums and differences of the input data of said M-point computational stage in a third predetermined order in which the component positions are circularly rotated by a predetermined numbers of positions.

3. The processor of claim 2 wherein said third data storage means comprises a first selectively addressable memory, and controller means for selectively addressing said first selectively addressable memory to retrieve the real and imaginary components in said third predetermined order wherein the order of the data has been circularly rotated by q positions where q is a solution to the equation $qL-bM+1=0$ and where b is representative of the reordering of the real and imaginary output data of the N point transform.

4. The processor of claim 1 wherein said first data storage means comprises a first selectively addressable memory, and controller means for selectively addressing said first selectively addressable memory to retrieve the sums and differences of the real and imaginary components of the input data in said first predetermined order.

5. The processor of claim 1 wherein said second data storage means comprises a second selectively addressable memory, and controller means for selectively addressing said second memory to separately retrieve the partial sums of the real and imaginary components in said second predetermined order.

6. The processor of claim 1:
wherein N is an odd integer, and
wherein said sums of the real components of the input data include sums $$S^+_{0R} = \sum_{i=0}^{N-1} a_{iR}; \quad S^+_{iR} = a_{iR} + a_{(N-i)R}, \quad i = 1,2,\ldots, \frac{N-1}{2};$$

wherein said differences of the real components of the input data include differences $S^-_{iR} = a_{iR} - a_{(N-i)R}$, $i=1,2,\ldots,N-1/2$;

wherein said sums of the imaginary components of the input data include sums $$S^+_{0I} = \sum_{i=0}^{N-1} a_{iI}; \quad S^+_{iI} = a_{iI} + a_{(N-i)I}, \quad i=1,2,\ldots,\frac{N-1}{2};$$

wherein said differences of the imaginary components of the input data include differences $S^-_{iI} = a_{iI} - a_{(N-i)I}$, $i=1,2,\ldots,N-1/2$; and wherein said partial sums include sums $T_{bR}$, $T_{bI}$, $U_{bR}$, $U_{bI}$, $b=1,2,\ldots,N-1/2$, when:

$$T_{bR} = \sum_{i=1}^{\frac{N-1}{2}} S^+_{iR}\left(\cos\frac{2\pi}{N}bi - 1\right) + S^+_{0R};$$

$$T_{bI} = \sum_{i=1}^{\frac{N-1}{2}} S^-_{iR}\left(\sin\frac{2\pi}{N}bi\right);$$

$$U_{bR} = \sum_{i=1}^{\frac{N-1}{2}} S^-_{iI}\left(\sin\frac{2\pi}{N}bi\right); \text{ and}$$

$$U_{bI} = \sum_{i=1}^{\frac{N-1}{2}} S^+_{iI}\left(\cos\frac{2\pi}{N}bi - 1\right) + S^+_{0I}.$$

7. The processor of claim 6 wherein said first predetermined order comprises the sequence $S^+_{0R}$, $S^+_{iR}$, $S^-_{iR}$, $S^+_{0I}$, $S^+_{iI}$, $S^-_{iI}$.

8. The processor of claim 6:
wherein said means for calculating the sums and differences of the input data comprises:
a plurality of data channels arranged in parallel with respect to each other, said plurality of data channels including:
a first data channel for calculating the sums of the real and imaginary components of the input data $S^+_{iR}$, $S^+_{iI}$ for $i=1,2,\ldots,N-1/2$;
a second data channel for calculating the differences of the real and imaginary components of the input data $S^-_{iR}$, $S^-_{iI}$ for $i=,1,2,\ldots,N-1/2$; and
a third data channel for calculating the sums of the amplitudes of the real and imaginary components of the input data $S^+_{0R}$, $S^+_{0I}$;
wherein said first data storage means includes a selectively addressable memory having 2 N storage locations;
wherein said means for multiplying the retrieved sums and differences and for summing the products to produce partial sums includes $N-1/2$ data channels arranged in parallel with respect to each other;
wherein said second data storage means includes a selectively addressable memory having 2 N storage locations; and
wherein said means for calculating the sums and differences of the partial sums to produce the output data includes two data channels arranged in parallel with respect to each other.

9. The processor of claim 8 wherein each of said first, second and third data channels comprises:
a summing circuit receiving input signals;
a first register receiving output signals from said summing circuit and applying input signals to said summing circuit; and
a second register receiving output signals from said first register and applying input signals to said first data storage means.

10. The processor of claim 8 wherein each of said $N-1/2$ data channels comprises:
a multiplier receiving said retrieved sums and differences of the real and imaginary components retrieved from said first data storage means in said first predetermined order;
a summing circuit receiving output signals from said multiplier;
a first register receiving output signals from said summing circuit and applying input signals to said summing circuit; and
a second register receiving output signals from said first register and applying partial sums to said second data storage means.

11. The processor of claim 10 wherein said first predetermined order comprises the sequence $S^+_{0R}$; $S^+_{iR}$, $i=1,2,\ldots,N-1/2$; $S^-_{iR}$, $i=1,2,\ldots,N-1/2$; $S^+_{0I}$; $S^+_{iI}$, $i=1,2,\ldots,N-1/2$; $S^-_{iI}$, $i=1,2,\ldots,N-1/2$.

12. The processor of claim 8 wherein each of said two data channels comprises:
a summing circuit receiving the data retrieved from said second data storage means in said second predetermined order;
a first register receiving output signals from said summing circuit and applying input signals to said summing circuit; and
a second register receiving output signals from said first register and producing output signals.

13. The processor of claim 12 wherein said second predetermined order comprises the sequence $T_{bR}$, $U_{bR}$, $b=1, 2,\ldots,N-1/2$; $U_{bI}$, $T_{bI}$, $b=1,2,\ldots,N-1/2$.

14. The processor of claim 1:
wherein $N=2^R$, $r \geq 2$; and
wherein said sums of the real components of the input data include sums $S^+_{0R} = a_{0R} + a_{N/2R}$; $S^+_{iR} = a_{iR} + a_{(N-i)R}$, $i=1,2,\ldots,N/2-1$;
wherein said differences of the real components of the input data include differences $S^-_{0R} = a_{0R} - a_{N/2R}$; $S^-_{iR} = a_{iR} - a_{(N-i)R}$, $i=1,2,\ldots,N/2-1$;
wherein said sums of the imaginary components of the input data include sums $S^+_{0I} = a_{0I} + a_{N/2I}$; $S^+_{iI} = a_{iI} + a_{(N-i)I}$, $i=1,2,\ldots,N/2-1$;
wherein said differences of the imaginary components of the input data include differences $S^-_{0I} = a_{0I} - a_{N/2I}$; $S^-_{iI} = a_{iI} - a_{(N-i)I}$, $i=1,2,\ldots,N/2-1$; and
wherein said partial sums include sums $$T^E_{bR} = \sum_{i=1}^{\frac{N}{4}-1} S^+_{2iR}\cos\frac{2\pi}{N}b(2i) + S^+_{0R}, \quad b = 0,2,4,\ldots,\frac{N}{4};$$

$$T^E_{bR} = \sum_{i=1}^{\frac{N}{4}-1} S^+_{2iR}\cos\frac{2\pi}{N}b(2i) + S^-_{0R}, \quad b = 1,3,5,\ldots,\frac{N}{4}-1;$$

$$T^o_{bR} = \sum_{i=0}^{\frac{N}{4}-1} S^+_{(2i+1)R}\cos\frac{2\pi}{N}b(2i+1), \quad b = 0,1,2,\ldots,\frac{N}{4}-1;$$

$$T^E_{bI} = \sum_{i=1}^{\frac{N}{4}-1} S^-_{2iR}\sin\frac{2\pi}{N}b(2i), \quad b = 1,2,\ldots,\frac{N}{4}-1;$$

-continued $$T^o_{bI} = \sum_{i=0}^{\frac{N}{4}-1} S^-_{(2i+1)R} \sin \frac{2\pi}{N} b(2i+1), b = 1,2,...,\frac{N}{4};$$

$$U^E_{bI} = \sum_{i=1}^{\frac{N}{4}-1} S^+_{2iI} \cos \frac{2\pi}{N} b(2i) + S^+_{0I}, b = 0,2,4,...,\frac{N}{4};$$

$$U^E_{bI} = \sum_{i=1}^{\frac{N}{4}-1} S^+_{2iI} \cos \frac{2\pi}{N} b(2i) + S^-_{0I}, b = 1,3,5,...,\frac{N}{4}-1;$$

$$U^o_{bI} = \sum_{i=0}^{\frac{N}{4}-1} S^+_{(2i+1)I} \cos \frac{2\pi}{4} b(2i+1), b = 0,1,2,...,\frac{N}{4}-1;$$

$$U^E_{bR} = \sum_{i=1}^{\frac{N}{4}-1} S^-_{2iI} \sin \frac{2\pi}{N} b(2i), b = 1,2,...,\frac{N}{4}-1; \text{ and}$$

$$U^o_{bR} = \sum_{i=1}^{\frac{N}{4}-1} S^-_{(2i+1)I} \sin \frac{2\pi}{N} b(2i+1), b = 1,2,...,\frac{N}{4};$$

where
$T_{(N/4)R}° = 0$;
$T^E_{0I} = 0$;
$T^E_{(N/4)I} = 0$;
$T°_{0I} = 0$;
$U°_{(N/4)I} = 0$;
$U^E_{0R} = 0$ and
$U^E_{(N/4)I} = 0$.

15. The processor of claim 14 wherein said first predetermined order comprises the sequence $S^+_{0R}$, $S^-_{0R}$, $S^+_{iR}$, $S^-_{iR}$, $S^+_{0I}$, $S^-_{0I}$, $S^+_{iI}$, $S^-_{iI}$.

16. The processor of claim 10:
wherein said means for calculating the sums and differences of the input data comprises:
a plurality of data channels arranged in parallel with respect to each other, said plurality of data channels including:
a first data channel for calculating the sums of the real and imaginary components of the input data $S^+_{iR}$, $S^+_{iI}$ for i=0,1,...,N/2−1; and
a second data channel for calculating the differences of the real and imaginary components of the input data $S^-_{iR}$, $S^-_{iI}$ for i=0,1,2,...,N/2−1;
wherein said first data storage means includes a selectively addressable memory having 2 N storage locations;
wherein said means for multiplying the retrieved sums and differences and for summing the products to produce partial sums includes N/4+1 data channels arranged in parallel with respect to each other;
wherein said second data storage means includes a selectively addressable memory having 2 N storage locations; and
wherein said means for calculating the sums and differences of the partial sums to produce the output data includes four data channels arranged in parallel with respect to each other.

17. The processor of claim 16 wherein each of said first and second data channels comprises:
a summing circuit receiving input signals;
a first register receiving output signals from said summing circuit and applying input signals to said summing circuit;
a second register receiving output signals from said first register and applying input signals to said first data storage means.

18. The processor of claim 16 wherein each of said N/4+1 data channels comprise:
a multiplier receiving said retrieved sums and differences of the real and imaginary components retrieved from said first data storage means in said first predetermined order;
a summing circuit receiving output signals from said multiplier;
a first register receiving output signals from said summing circuit and applying input signals to said summing circuit; and
a second register receiving output signals from said first register and applying partial sums to said second data storage means.

19. The processor of claim 18 wherein said first predetermined order comprises the sequence $S^+_{0R}$; $S^-_{0R}$; $S^+_{iR}$, i=1,2,...,N/2−1; $S^-_{iR}$, i=1,2,...,N/2−1; $S^+_{0I}$, $S^-_{0I}$, $S^+_{iI}$, i=1,2,...,N/2−1; $S^-_{iI}$, i=1,2,...,N/2−1.

20. The processor of claim 16 wherein each of said four data channels comprises:
a summing circuit receiving the data retrieved from said second storage means in said second predetermined order;
a first register receiving output signals from said summing circuit and applying input signals to said summing circuits; and
a second register receiving output signals from said first register and producing output signals.

21. The processor of claim 9, 12, 17 or 20 wherein said summing circuit comprises:
a controllable data signal control circuit receiving input signals, said input signals including an add-/subtract control signal; and
a first summing circuit receiving output signals from said controllable data signal control circuit and from said first register;
wherein when said summing circuit is to calculate a difference said controllable data signal control circuit selectively inverts input data in response to said add/subtract control signal; and
wherein when said summing circuit is to calculate a sum said controllable data signal control circuit selectively does not invert input data in response to said add/subtract control signal.

22. The processor of claim 9, 12, 17 or 20 wherein said summing circuit comprises:
a programmable read-only memory receiving input signals, said input signals including an add/subtract control signal and output signals from said first register; and
wherein said programmable read-only memory selectively adds and subtracts input signals in response to said add/subtract control signal.

23. The processor of claim 9, 12, 17 or 20 wherein said summing circuit and said first register comprise an integrated add/subtract accumulator.

24. The processor of claim 10 or 18:
wherein said multiplier includes first and second input terminals, said first input terminal receiving said retrieved sums and differences and said second input terminal receiving said predetermined constant values;
wherein said summing circuit comprises:

a controllable data signal control circuit receiving input signals, said input signals including output signals from said multiplier and an add/subtract control signal; and a first summing circuit receiving output signals from said controllable data signal control circuit and from said first register;

wherein when said summing circuit is to calculate a difference said controllable data signal control circuit selectively inverts input data in response to said add/subtract control signal; and wherein when said summing circuit is to calculate a sum said controllable data signal control circuit selectively does not invert input data in response to said add/subtract control signal.

25. The processor of claim 24 wherein said summing circuit and said first register comprise an integrated add/subtract accumulator.

26. The processor of claim 10 or 18:

wherein said multiplier comprises a first programmable read-only memory receiving input signals, said predetermined constant values being stored in said first programmable read-only memory;

wherein said summing circuit comprises a second programmable read-only memory receiving input signals, said input signals including an add/subtract control signal, output signals from said first programmable read-only memory, and output signals from said first register; and wherein said second programmable read-only memory selectively adds and subtracts input signals in response to said add/subtract control signal.

27. The processor of claim 10 or 18 wherein said multiplier, said summing circuit and said first register comprise an integrated multiply/accumulator.

28. A processor for processing N discrete samples of a quantized time domain signal to determine the frequency content thereof comprising:

a first data memory stage for storing the discrete samples of the quantized time domain signal and for retrieving said stored samples in a predetermined order in which component positions are circularly rotated by a predetermined number of positions from the order of storage thereof;

an L-point computational stage receiving the retrieved samples of the quantized time domain signal from said first data memory stage and calculating real and imaginary output signals representing the solution to an L-point Discrete Fourier Transform;

a second data memory stage for storing and retrieving the real and imaginary output signals from said L-point computational stage; and an M-point computational stage, where N=LM and L and M are relatively prime numbers, receiving the retrieved real and imaginary output signals from said second data memory stage and calculating real and imaginary output signals representing the solution to an LM point Discrete Fourier Transform.

29. The processor of claim 28 wherein said first data memory stage comprises a real part for storing signals representing real components of the discrete samples and an imaginary part for storing signals representing imaginary components of the discrete samples; and wherein said second data memory stage comprises a real part for storing the real output signals from said L-point computational stage, and an imaginary part for storing the imaginary output signals from said L-point computational stage.

30. A method for processing a time domain signal to determine the frequency content thereof, comprising the steps of:

(a) quantizing the time domain signal to produce N discrete input data samples $a_i (i=0,1,2 \ldots ,N-1)$ having real components $a_{iR}$ and imaginary components $a_{iI}$;

(b) calculating and storing sums and differences of the real components of the input data samples;

(c) calculating and storing sums and differences of the imaginary components of the input of data samples;

(d) retrieving the stored sums and differences of the real and imaginary components in accordance with a first predetermined order of retrieval;

(e) multiplying the retrieved sums and differences of the real and imaginary components, in the order of retrieval, by predetermined constant values and summing the products with at least some of the retrieved sums and differences to produce partial sums of the real and imaginary components;

(f) storing the partial sums as they are produced;

(g) retrieving the stored partial sums in accordance with a second predetermined order of retrieval in order to separately retrieve the partial sums of the real and imaginary components; and (h) calculating the sums and differences of the retrieved partial sums of the real components and the retrieved partial sums of the imaginary components to produce real and imaginary output data representing the frequency content of the time domain signal.

31. The method of claim 7 wherein N is an odd integer, and:

wherein the step of calculating and storing sums and differences of the real components of the input data samples includes the steps of:

calculating and storing sums $$S^+_{0R} = \sum_{i=0}^{N-1} a_{iR}; \quad S^+_{iR} = a_{iR} + a_{(N-i)R}, \quad i = 1,2,\ldots, \frac{N-1}{2}; \text{ and}$$

calculating and storing differences $S^-_{iR} = a_{iR} - a_{(N-i)R}$, $i=1,2,\ldots,N-1/2$;

wherein the step of calculating and storing sums and differences of the imaginary components of the input data samples includes the steps of:

calculating and storing sums $$S^+_{0I} = \sum_{i=0}^{N-1} a_{iI}; \quad S^+_{iI} = a_{iI} + a_{(N-i)I}, \quad i = 1,2,\ldots, \frac{N-1}{2}; \text{ and}$$

calculating and storing differences $S^-_{iI} = a_{iI} - a_{(N-i)I}$, $i=1,2,\ldots,N-1/2$; and wherein the step of producing partial sums of the real and imaginary components includes the step of producing partial sums $T_{bR}, T_{bI}, U_{bR}, U_{bI}$, $b=1,2,\ldots,N-1/2$, when:

$$T_{bR} = \sum_{i=1}^{\frac{N-1}{2}} S^+_{iR} \left( \cos \frac{2\pi}{N} bi - 1 \right) + S^+_{0R};$$

$$T_{bI} = \sum_{i=1}^{\frac{N-1}{2}} S^-_{iR} \left( \sin \frac{2\pi}{N} bi \right);$$

$$U_{bR} = \sum_{i=1}^{\frac{N-1}{2}} S_{iI}^{-}\left(\sin\frac{2\pi}{N}bi\right) \text{; and}$$

$$U_{bI} = \sum_{i=1}^{\frac{N-1}{2}} S_{iI}^{+}\left(\cos\frac{2\pi}{N}bi - 1\right) + S_{0I}^{+}.$$

32. The method of claim 31 wherein the step of retrieving the stored sums and differences of the real and imaginary components in accordance with a first predetermined order of retrieval includes retrieving said stored sums and differences in the sequence $S^{+}_{0R}$; $S^{+}_{iR}$, i=1,2, ... ,N−1/2; $S^{-}_{iR}$, i=1,2, ... ,N−1/2; $S^{+}_{0I}$, $S^{+}_{iI}$, i=1,2, ... ,N−1/2; $S^{-}_{iI}$, i=1,2, ... ,N−1/2.

33. The method of claim 31 wherein the step of retrieving the stored partial sums in accordance with a second predetermined order of retrieval includes retrieving the stored partial sums in the sequence $T_{bR}$, $U_{bR}$, b=1,2, ..., N−1/2; $U_{bI}$, $T_{bI}$, b=1,2, ...,N−1/2.

34. The method of claim 7 wherein N=$2^r$, r≧2, and:
wherein the step of calculating and storing sums and differences of the real components of the input data samples includes the steps of:
calculating and storing sums $S^{+}_{0R}=a_{0R}+a_{N/2R}$; $S^{+}_{iR}=a_{iR}+a_{(N-i)R}$, i=1,2, ... ,N/2−1; and
calculating and storing differences $S^{-}_{0R}=a_{0R}-a_{N/2R}$; $S^{-}_{iR}=a_{iR}-a_{(N-i)R}$, i=1,2, ... ,N/2−1;
wherein the step of calculating and storing sums and differences of the imaginary components of the input data samples includes the steps of:
calculating and storing sums $S^{+}_{0I}=a_{0I}+a_{N/2I}$, $S^{+}_{iI}=a_{iI}+a_{(N-1)I}$, i=1,2, ... ,N/2−1; and
calculating and storing differences $S^{-}_{0I}=a_{0I}-a_{N/2I}$, $S^{-}_{iI}=a_{iI}-a_{(N-i)I}$, i=1,2, ... ,N/2−1; and
wherein the step of producing partial sums of the real and imaginary components includes the step of producing partial sums $$T_{bR}^{E} = \sum_{i=1}^{\frac{N}{4}-1} S_{2iR}^{+}\cos\frac{2\pi}{N}b(2i) + S_{OR}^{+}, \ b = 0,2,4,..., \frac{N}{4};$$

$$T_{bR}^{E} = \sum_{i=1}^{\frac{N}{4}-1} S_{2iR}^{+}\cos\frac{2\pi}{N}b(2i) + S_{OR}^{-}, \ b = 1,3,5,..., \frac{N}{4}-1;$$

$$T_{bR}^{o} = \sum_{i=0}^{\frac{N}{4}-1} S_{(2i+1)R}^{+}\cos\frac{2\pi}{N}b(2i+1), \ b = 0,1,2,..., \frac{N}{4}-1;$$

$$T_{bI}^{E} = \sum_{i=1}^{\frac{N}{4}-1} S_{2iR}^{-}\sin\frac{2\pi}{N}b(2i), \ b = 1,2,..., \frac{N}{4}-1;$$

$$T_{bI}^{o} = \sum_{i=0}^{\frac{N}{4}-1} S_{(2i+1)R}^{-}\sin\frac{2\pi}{N}b(2i+1), \ b = 1,2,..., \frac{N}{4};$$

$$U_{bI}^{E} = \sum_{i=1}^{\frac{N}{4}-1} S_{2iI}^{+}\cos\frac{2\pi}{N}b(2i) + S_{OI}^{+}, \ b = 0,2,4,..., \frac{N}{4};$$

$$U_{bI}^{E} = \sum_{i=1}^{\frac{N}{4}-1} S_{2iI}^{+}\cos\frac{2\pi}{N}b(2i) + S_{OI}^{-}, \ b = 1,3,5,..., \frac{N}{4}-1;$$

$$U_{bI}^{o} = \sum_{i=0}^{\frac{N}{4}-1} S_{(2i+1)I}^{+}\cos\frac{2\pi}{N}b(2i+1), \ b = 0,1,2,..., \frac{N}{4}-1;$$

$$U_{bR}^{E} = \sum_{i=1}^{\frac{N}{4}-1} S_{2iI}^{-}\sin\frac{2\pi}{N}b(2i), \ b = 1,2,..., \frac{N}{4}-1; \text{ and}$$

$$U_{bR}^{o} = \sum_{i=1}^{\frac{N}{4}-1} S_{(2i+1)I}^{-}\sin\frac{2\pi}{N}b(2i+1), \ b = 1,2,..., \frac{N}{4};$$

where
$T^{o}_{4/NR}=0$;
$T^{E}_{0I}=0$;
$T^{E}_{(N/4)I}=0$;
$T^{o}_{0I}=0$;
$U^{o}_{(N/4)I}=0$;
$U^{E}_{0R}=0$ and
$U^{E}_{(N/4)I}=0$.

35. The method of claim 34 wherein the step of retrieving the stored sums and differences of the real and imaginary components in accordance with a first predetermined order of retrieval includes retrieving said stored sums and differences in the sequence $S^{+}_{0R}$; $S^{-}_{0R}$; $S^{+}_{iR}$, i=1,2, ... ,N/2−1; $S^{-}_{iR}$, i=1,2, ... ,N/2−1; $S^{+}_{0I}$, $S^{-}_{0I}$, $S^{+}_{iI}$, i=1,2, ... ,N/2−1; $S^{-}_{iI}$, i=1,2, ... ,N/2−1.

36. The method of claim 7 wherein N=3 and:
wherein the step (b) includes calculating and storing sum $$S^{+}_{iR}=a_{1R}+a_{2R}$$

and difference $$S^{-}_{iR}=a_{1R}-a_{2R};$$

wherein the step (c) includes calculating and storing sums $$S^{+}_{1I}=a_{1I}+a_{2I}$$

and difference $$S^{-}_{1I}=a_{1I}-a_{2I};$$

wherein the step (b) further includes calculating and storing sum $$S^{+}_{0R}=a_{1R}+a_{2R}+a_{0R};$$

wherein the step (c) further includes calculating and storing sum $$S^{+}_{0I}=a_{1I}+a_{2I}+a_{0I};$$

wherein the step (e) includes calculating partial sums:

$$T_{1R} = S^{+}_{1R}\left(\cos\frac{2\pi}{3} - 1\right)$$

$$T_{1I} = S^{-}_{1R}\left(\sin\frac{2\pi}{3}\right)$$

-continued $$U_{1R} = S_{1I}^{-}\left(\sin\frac{2\pi}{3}\right)$$

$$U_{1I} = S_{1I}^{+}\left(\cos\frac{2\pi}{3} - 1\right); \text{ and}$$

wherein the step (h) includes calculating frequency components:

$A_{0R} = S^{+}_{0R}$ $A_{0I} = S^{+}_{0I}$ $A_{1R} = T_{1R} + S_{0R} + U_{1R}$ $A_{1R} = -T_{1I} + S^{+}_{0R} + U_{1I}$ $A_{2R} = T_{1R} + S^{+}_{0R} - U_{1R}$ $A_{2I} = T_{1I} + S^{+}_{0I} + U_{1I}$.

37. The method of claim 30 wherein N=5 and:
wherein the steps (b), (c) include calculating and storing sums and differences:

$S_{1R}^{+} = a_{1R} + a_{4R}$ $S_{1R}^{-} = a_{1R} - a_{4R}$ $S_{2R}^{+} = a_{2R} + a_{3R}$ $S_{2R}^{-} = a_{2R} - a_{3R}$ $S_{1I}^{+} = a_{1I} + a_{4I}$ $S_{1I}^{-} = a_{1I} - a_{4I}$ $S_{2I}^{+} = a_{2I} + a_{3I}$ $S_{2I}^{-} = a_{2I} - a_{3I}$ $S_{0R}^{+} = a_{0R} + a_{1R} + a_{2R} + a_{3R} + a_{4R}$ $S_{0I}^{+} = a_{0I} + a_{1I} + a_{2I} + a_{3I} + a_{4I}$;

wherein the step (e) includes calculating partial sums:

$$T_{1R} = S_{1R}^{+}\left(\cos\frac{2\pi}{5} - 1\right) + S_{0R}^{+} + S_{2R}^{+}\left(\cos\frac{4\pi}{5} - 1\right)$$

$$T_{2R} = S_{1R}^{+}\left(\cos\frac{4\pi}{5} - 1\right) + S_{0R}^{+} + S_{2R}^{+}\left(\cos\frac{2\pi}{5} - 1\right)$$

$$T_{1I} = S_{1R}^{-}\sin\frac{2\pi}{5} + S_{2R}^{-}\sin\frac{4\pi}{5}$$

$$T_{2I} = S_{1R}^{-}\sin\frac{4\pi}{5} - S_{2R}^{-}\sin\frac{2\pi}{5}$$

$$U_{1R} = S_{1I}^{-}\sin\frac{2\pi}{5} + S_{2I}^{-}\sin\frac{4\pi}{5}$$

$$U_{2R} = S_{1I}^{-}\sin\frac{4\pi}{5} + S_{2I}^{-}\sin\frac{2\pi}{5}$$

$$U_{1I} = S_{1I}^{+}\left(\cos\frac{2\pi}{5} - 1\right) + S_{2I}^{+}\left(\cos\frac{4\pi}{5} - 1\right) + S_{0I}^{+}$$

$$U_{2I} = S_{1I}^{+}\left(\cos\frac{4\pi}{5} - 1\right) + S_{2I}^{+}\left(\cos\frac{2\pi}{5} - 1\right) + S_{0I}^{+}; \text{ and}$$

wherein the step (h) includes calculating frequency components:

$A_{0R} = S^{+}_{0R}$ $A_{0I} = S^{+}_{0I}$ $A_{1R} = T_{1R} + U_{1R}$ $A_{1I} = -T_{1I} + U_{1I}$ $A_{2R} = T_{2R} + U_{2R}$ $A_{2I} = -T_{2I} + U_{2I}$ $A_{3R} = T_{2R} - U_{2R}$ $A_{3I} = T_{2I} + U_{2I}$ $A_{4R} = T_{1R} - U_{1R}$ $A_{4I} = T_{1I} + U_{1I}$.

38. The method of claim 30 wherein N=8 and:
wherein the steps (b), (c) include calculating sums and differences:

$S_{0R}^{+} + S_{2R}^{+} = a_{0R} + a_{4R} + a_{2R} + a_{6R}$ $S_{0R}^{+} - S_{2R}^{+} = a_{0R} + a_{4R} - a_{2R} - a_{6R}$ $S_{0R}^{-} = a_{0R} - a_{4R}$ $S_{2R}^{-} = a_{2R} - a_{6R}$ $S_{0I}^{+} + S_{2I}^{+} = a_{0I} + a_{4I} + a_{2I} + a_{6I}$ $S_{0I}^{+} - S_{2I}^{+} = a_{0I} + a_{4I} - a_{2I} - a_{6I}$ $S_{0I}^{-} a_{0I} - a_{4I}$ $S_{2I}^{-} = a_{2I} - a_{6I}$ $S_{1R}^{+} + S_{3R}^{+} = a_{1R} + a_{7R} + a_{3R} + a_{5R}$ $S_{1R}^{+} - S_{3R}^{+} = a_{1R} + a_{7R} - a_{3R} - a_{5R}$ $S_{1R}^{-} + S_{3R}^{-} = a_{1R} - a_{7R} + a_{3R} - a_{5R}$ $S_{1R}^{-} - S_{3R}^{-} = a_{1R} - a_{7R} - a_{3R} + a_{5R}$ $S_{1I}^{+} + S_{3I}^{+} = a_{1I} + a_{7I} + a_{3I} + a_{5I}$ $S_{1I}^{+} - S_{3I}^{+} = a_{1I} + a_{7I} - a_{3I} - a_{5I}$ $S_{1I}^{-} + S_{3I}^{-} a_{1I} + a_{7I} - a_{3I} - a_{5I}$ $S_{1I}^{-} + S_{3I}^{-} = a_{1I} - a_{7I} - a_{3I} + a_{5I}$;

wherein the step (e) includes calculating partial sums:

$T_{0R}^{E} = (S_{0R}^{+} + S_{2R}^{+}) \cdot 1$ $T_{0R}^{o} = (S_{3R}^{+}) \cdot 1$ $T_{1R}^{E} = (S_{0R}^{-}) \cdot 1$ $$T_{1R}^{o} = (S_{1R}^{+} - S_{3R}^{+})\cos\frac{2\pi}{8}$$

$U_{1R}^{E} = (S_{2I}^{-}) \cdot 1$

-continued $$U^o_{1R} = (S^-_{1I} + S^-_{3I}) \sin \frac{2\pi}{8}$$

$$T^E_{2R} = (S^+_{0R} - S^+_{2R}) \cdot 1$$

$$U^o_{2R} = (S^-_{1I} - S^-_{1I}) \cdot 1$$

$$U^E_{0I} = (S^+_{0I} + S^+_{2I}) \cdot 1$$

$$U^o_{0I} = (S^+_{1I} + S^+_{3I}) \cdot 1$$

$$U^E_{1I} = (S^-_{0I}) \cdot 1$$

$$U^o_{1I} = (S^+_{1I} - S^+_{3I}) \cos \frac{2\pi}{8}$$

$$T^E_{1I} = (S^-_{2R}) \cdot 1$$

$$T^o_{1I} = (S^-_{1R} + S^-_{3R}) \sin \frac{2\pi}{8}$$

$$U^E_{2I} = (S^{30}_{0I} - S^+_{2I}) \cdot 1$$

$$T^o_{2I} = (S^-_{1R} - S^-_{3R}) \cdot 1; \text{ and}$$

wherein the step (h) includes calculating frequency components:

$$A_{0R} = T^E_{0R} + T^o_{0R}$$

$$A_{4R} = T^E_{0R} - T^o_{0R}$$

$$A_{1R} = T^E_{1R} + U^E_{1R} + T^o_{1R} + U^o_{1R}$$

$$A_{3R} = T^E_{1R} - T^o_{1R} + U^o_{1R} - U^E_{1R}$$

$$A_{7R} = T^E_{1R} - U^E_{1R} + T^o_{1R} - U^o_{1R}$$

$$A_{5R} = T^E_{1R} - T^o_{1R} - U^o_{1R} + U^E_{1R}$$

$$A_{2R} = T^E_{2R} + U^o_{2R}$$

$$A_{6R} = T^E_{2R} - U^o_{2R}$$

$$A_{0I} = U^E_{0I} + U^o_{0I}$$

$$A_{4I} = U^E_{0I} - U^o_{0I}$$

$$A_{1I} = U^E_{1I} + U^o_{1I} - T^E_{1I} - T^o_{1I}$$

$$A_{3I} = U^E_{1I} - U^o_{1I} + T^E_{1I} - T^o_{1I}$$

$$A_{7I} = U^E_{1I} + U^o_{1I} + T^E_{1I} + T^o_{1I}$$

$$A_{5I} = U^E_{1I} - U^o_{1I} - T^E_{1I} + T^o_{1I}$$

$$A_{2I} = U^E_{2I} + T^o_{2I}$$

$$A_{6I} = U^E_{2I} + T^o_{2I}.$$

39. A processor for processing N discrete samples of a quantized time domain signal to determine the frequency content thereof comprising:
a first data memory stage for storing the discrete samples of the quantized time domain signal and for retrieving said stored samples in a first predetermined order in which component positions are circularly rotated by a predetermined number of positions from the order of storage thereof;
an $L_1$-point computational stage receiving the retrieved samples of the quantized time domain signal from said first data memory stage and calculating real and imaginary output signals representing the solution to an $L_1$-point Discrete Fourier Transform;
a second data memory stage for storing the real and imaginary output signals from said $L_1$-point computational stage and for retrieving said stored signals in a second predetermined order in which component positions are circularly rotated by a predetermined number of positions from the order of storage thereof;
an $L_2$-point computational stage receiving the retrieved signals from said second data memory stage and calculating real and imaginary output signals representing the solution to an $L_1 \cdot L_2$-point Discrete Fourier Transform;
a third data memory stage for storing and retrieving the real and imaginary output signals from said $L_2$-point computational stage;
an $L_3$-point computational stage receiving the retrieved real and imaginary output signals from said third data memory stage and calculating real and imaginary output signals representing the solution to an $L_1 \cdot L_2 \cdot L_3$-point Discrete Fourier Transform; and
a fourth data memory stage for storing and retrieving the real and imaginary output signals from said $L_3$-point computational stage;
wherein $N = L_1 \cdot L_2 \cdot L_3$ and further wherein $L_1$, $L_2$ and $L_3$ are relatively prime numbers.

40. The processor of claim 39 wherein each of said data memory stages includes a real part for storing real components of complex data and an imaginary part for storing imaginary components of complex data.

41. The processor of claim 40 wherein each of said real and imaginary parts of said data memory stages includes a first half and a second half such that data can be read into one of said first and second halves while data is being written out of the other of said first and second halves.

42. The processor of claim 40 wherein each of said data memory stages further includes:
a plurality of selectively addressable random access memories; and
controller means for selectively addressing said random access memories, said controller means including a plurality of programmable read-only memories and a plurality of binary counters, said programmable read-only memories being selectively addressed by said binary counters.

43. The processor of claim 40 further comprising:
a first input register included between said first data memory stage and said $L_1$-point computational stage for synchronizing data fed to said $L_1$-point computational stage from said first data memory stage;
a second input register included between said second data memory stage and said $L_2$-point computational stage for synchronizing data fed to said $L_2$-point computational stage from said second data memory stage; and
a third input register included between said third data memory stage and said $L_3$-point computational stage for synchronizing data fed to said $L_3$-point computational stage from said third data memory stage.

44. The processor of claim 43:
wherein said first input register comprises:
a first set of $L_1$ serially loaded multi-bit registers selectively receiving data from the real part of said first data memory stage;
a second set of $L_1$ serially loaded multi-bit registers selectively receiving data from the imaginary part of said first data memory stage;

a first set of $L_1$ parallel loaded multi-bit registers; and a second set of $L_1$ parallel loaded multi-bit registers;

wherein when said first set of serially loaded registers is serially loaded so as to contain $L_1$ multi-bit data words, said $L_1$ data words are read in parallel into said first set of parallel loaded registers;

wherein when said second set of serially loaded registers is serially loaded so as to contain $L_1$ multi-bit data words, said $L_1$ data words are read in parallel into said second set of parallel loaded registers; and further wherein data words contained in said first and second sets of parallel loaded registers are multiplexed from said parallel loaded registers to said $L_1$-point computational stage;

wherein said second input register comprises:
a first set of $L_2$ serially loaded multi-bit registers selectively receiving data from the real part of said second data memory stage;
a second set of $L_2$ serially loaded multi-bit registers selectively receiving data from the imaginary part of said second data memory stage;
a first set of $L_2$ parallel loaded multi-bit registers; and
a second set of $L_2$ parallel loaded multi-bit registers;

wherein when said first set of serially loaded registers is serially loaded so as to contain $L_2$ multi-bit data words, said $L_2$ data words are read in parallel into said first set of parallel loaded registers;

wherein when said second set of serially loaded registers is serially loaded so as to contain $L_2$ multi-bit data words, said $L_2$ data words are read in parallel into said second set of parallel loaded registers; and further wherein data words contained in said first and second sets of parallel loaded registers are multiplexed from said parallel loaded registers to said $L_2$-point computational stage; and wherein said third input register comprises:
a first set of $L_3$ serially loaded multi-bit registers selectively receiving data from the real part of said third data memory stage;
a second set of $L_3$ serially loaded multi-bit registers selectively receiving data from the imaginary part of said third data memory stage;
a first set of $L_3$ parallel loaded multi-bit registers; and
a second set of $L_3$ parallel loaded multi-bit registers;

wherein when said first set of serially loaded registers is serially loaded so as to contain $L_3$ multi-bit data words, said $L_3$ data words are read in parallel into said first set of parallel loaded registers;

wherein when said second set of serially loaded registers is serially loaded so as to contain $L_3$ multi-bit data words, said $L_3$ data words are read in parallel into said second set of parallel loaded registers; and further wherein data words contained in said first and second sets of parallel loaded registers are multiplexed from said parallel loaded registers to said $L_3$-point computational stage.

45. The processor of claim 40 further comprising:
a first output register included between said $L_1$-point computational stage and said second data memory stage for synchronizing data fed to said second data memory stage from said $L_1$-point computational stage;

a second output register included between said $L_2$-point computational stage and said third data memory stage for synchronizing data fed to said third data memory stage from said $L_2$-point computational stage; and a third output register included between said $L_3$-point computational stage and said fourth data memory stage for synchronizing data fed to said fourth data memory stage from said $L_3$-point computational stage.

46. The processor of claim 45:
wherein said first output register comprises:
$L_1$ groups of registers selectively receiving $L_1$ multi-bit data words from said $L_1$-point computational stage, said data words being selectively multiplexed from said $L_1$ groups of registers to the real part of said second data memory stage; and $L_1$ groups of registers selectively receiving $L_1$ multi-bit data words from said $L_1$-point computational stage, said data words being selectively multiplexed from said $L_1$ groups of registers to the imaginary part of said second data memory stage;

wherein said second output register comprises:
$L_2$ groups of registers selectively receiving $L_2$ multi-bit data words from said $L_2$-point computational stage, said data words being selectively multiplexed from said $L_2$ groups of registers to the real part of said third data memory stage; and $L_2$ groups of registers selectively receiving $L_2$ multi-bit data words from said $L_2$-point computational stage, said data words being selectively multiplexed from said $L_2$ groups of registers to the imaginary part of said third data memory stage; and wherein said third output register comprises:
$L_3$ groups of registers selectively receiving $L_3$ multi-bit data words from said $L_3$-point computational stage, said data words being selectively multiplexed from said $L_3$ groups of registers to the real part of said fourth data memory stage; and $L_3$ groups of registers selectively receiving $L_3$ multi-bit data words from said $L_3$-point computational stage, said data words being selectively multiplexed from said $L_3$ groups of registers to the imaginary part of said fourth data memory stage.

47. A processor for processing input data comprising three discrete samples $a_0$, $a_1$, $a_2$ of a quantized time domain signal having real components $a_{0R}$, $a_{1R}$, $a_{2R}$ and imaginary components $a_{0I}$, $a_{1I}$, $a_{2I}$ in order to determine the frequency components $A_0$, $A_1$, $A_2$ of the Discrete Fourier Transform of said input data, said processor comprising:
first, second, third, fourth, fifth and sixth adders;
first and second inverters;
first and second programmable read-only memories;
first, second and third registers; and
a counter;
said first adder selectively receiving the real and imaginary components of said sample $a_0$ and receiving output signals from said second adder; and
said first register receiving output signals from said first adder, the output of said first register being the frequency component $A_0$;

said second adder selectively receiving the real and imaginary components of said samples $a_1$, $a_2$;

said first programmable read-only memory receiving output signals from said second adder;

said second register receiving output signals from said first programmable read-only memory;

said fourth adder receiving output signals from said first and second registers; and said fifth adder receiving output signals from said fourth adder and from said third register, the output from said fifth adder being the frequency component $A_1$;

said first inverter selectively receiving the real and imaginary components of said sample $a_2$;

said third adder selectively receiving the real and imaginary components of the sample $a_1$, said third adder receiving output signals from said first inverter, and said third adder receiving a constant;

said second programmable read-only memory receiving output signals from said third adder;

said third register receiving output signals from said second programmable read-only memory and from said counter;

said second inverter receiving output signals from said third register; and said sixth adder receiving a constant and receiving output signals from said second inverter and from said fourth adder, the output of said sixth adder being the frequency component $A_2$.

48. A processor for processing input data comprising five discrete samples $a_i$, $i=0,1,2,3,4$, of a quantized time domain signal having real components $a_{iR}$ and imaginary components $a_{iI}$ in order to determine frequency components of the Discrete Fourier Transform of said input data, said processor comprising:

seventeen adders;
seven inverters;
five programmable read-only memories;
six registers; and
one counter;

wherein a first adder selectively receives the real and imaginary components of said sample $a_o$ and receives output signals from a third adder; and wherein a first register receives output signals from said first adder, the output of said first register being frequency components $A_{0I}$, $A_{0R}$;

wherein a second adder selectively receives the real and imaginary components of said samples $a_1$, $a_4$;

wherein said third adder receives output signals from said second adder and from a sixth adder;

wherein a first programmable read-only memory receives output signals from said third adder;

wherein a second register receives output signals from said first programmable read-only memory;

wherein a ninth adder receives output signals from said first and second registers;

wherein a tenth adder receives output signals from said ninth adder and from a fourth register; and wherein an eleventh adder receives output signals from said tenth adder and from a twelfth adder, the output of said eleventh adder being frequency components $A_{4I}$, $A_{1R}$;

wherein a first inverter selectively receives the real and imaginary components of said sample $a_4$;

wherein a fourth adder selectively receives the real and imaginary components of said sample $a_1$, receives a constant and receives output signals from said first inverter;

wherein a fifth adder receives output signals from said fourth adder and from an eighth adder;

wherein a second programmable read-only memory receives output signals from said fifth adder;

wherein a third register receives output signals from said second programmable read-only memory and from said counter;

wherein said twelfth adder receives output signals from said third register and from a sixth register;

wherein a fifth programmable read-only memory receives output signals from said fourth adder;

wherein said sixth register receives output signals from said counter and from said fifth programmable readonly memory;

wherein a second inverter receives output signals from said twelfth adder; and wherein a thirteenth adder receives output signals from said tenth adder and from said second inverter, the output of said thirteenth adder being frequency components $A_{1I}$, $A_{4R}$;

wherein said sixth adder selectively receives the real and imaginary components of said samples $a_2$, $a_3$;

wherein a third inverter receives output signals from said sixth adder;

wherein a seventh adder receives a constant and receives output signals from said third inverter;

wherein a third programmable read-only memory receives output signals from said seventh adder;

wherein said fourth register receives output signals from said third programmable read-only memory;

wherein a fourth inverter receives output signals from said fourth register;

wherein a fourteenth adder receives a constant and receives output signals from said ninth adder and said fourth inverter; and wherein a fifteenth adder receives output signals from said fourteenth adder and from a sixteenth adder, the output of said fifteenth adder being frequency components $A_{3I}$, $A_{2R}$;

wherein a fifth inverter selectively receives the real and imaginary components of said sample $a_3$;

wherein said eighth adder selectively receives the real and imaginary components of said sample $a_2$, receives a constant and receives output signals from said fifth inverter;

wherein a fourth programmable read-only memory receives output signals from said eighth adder;

wherein a fifth register receives output signals from said counter and from said fourth programmable read-only memory;

wherein a sixth inverter receives output signals from said fifth register;

wherein said sixteenth adder receives a constant and receives output signals from said third register and said sixth inverter;

wherein a seventh inverter receives output signals from said sixteenth adder; and wherein a seventeenth adder receives a constant and receives output signals from said fourteenth adder and said seventh inverter, the output of said seventeenth adder being frequency components $A_{2I}$, $A_{3R}$.

49. A processor for processing input data comprising eight discrete samples $a_i$, $i=0,1,2,\ldots,7$, of a quantized time domain signal having real components $a_{iR}$ and imaginary components $a_{iI}$ in order to determine frequency components of the Discrete Fourier Transform of said input data, said processor comprising:

twenty-six adders;
thirteen inverters;
first and second programmable read-only memories;
eight registers; and
one counter;
wherein a first adder selectively receives the real and imaginary components of said samples $a_0$, $a_4$;
wherein a second adder receives output signals from said first adder and from a fourth adder;
wherein a first register receives output signals from said second adder; and
wherein a fifteenth adder receives output signals from said first register and from a fifth register, the output of said fifteenth adder being frequency components $A_{0I}$, $A_{0R}$;
wherein a first inverter selectively receives the real and imaginary components of said sample $a_4$;
wherein a third adder selectively receives the real and imaginary components of said sample $a_0$, receives a constant and receives output signals from said first inverter;
wherein a second register receives output signals from said third adder;
wherein a sixteenth adder receives output signals from said second register and from a fourth register; and
wherein a seventeenth adder receives output signals from said sixteenth adder and from a twenty-second adder, the output of said seventeenth adder being frequency components $A_{7I}$, $A_{1R}$;
wherein said fourth adder selectively receives the real and imaginary components of said samples $a_2$, $a_6$;
wherein a second inverter receives output signals from said fourth adder;
wherein a fifth adder receives a constant and receives output signals from said first adder and said second inverter;
wherein a third register receives output signals from said fifth adder; and
wherein an eighteenth adder receives output signals from said third register and from an eighth register, the output of said eighteenth adder being frequency components $A_{6I}$, $A_{2R}$;
wherein a third inverter selectively receives the real and imaginary components of said sample $a_6$;
wherein a sixth adder selectively receives the real and imaginary components of said sample $a_2$, receives a constant and receives output signals from said third inverter;
wherein said fourth register receives output signals from said sixth adder;
wherein a fourth inverter receives output signals from said fourth register;
wherein a nineteenth adder receives a constant and receives output signals from said second register and from said fourth inverter; and
wherein a twentieth adder receives output signals from said nineteenth adder and from a twenty-fourth adder, the output of said twentieth adder being frequency components $A_{1I}$, $A_{7R}$;
wherein a seventh adder selectively receives the real and imaginary components of said samples $a_1$, $a_7$;
wherein an eighth adder receives output signals from said seventh adder and from an eleventh adder;
wherein said fifth register receives output signals from said eighth adder;
wherein a fifth inverter receives output signals from said fifth register; and
wherein a twenty-first adder receives a constant and receives output signals from said first register and said fifth inverter, the output of said twenty-first adder being frequency components $A_{4I}$, $A_{4R}$;
wherein a sixth inverter selectively receives the real and imaginary components of said sample $a_7$;
wherein a ninth adder selectively receives the real and imaginary components of said sample $a_1$, receives a constant and receives output signals from said sixth inverter;
wherein a tenth adder receives output signals from said ninth adder and from a thirteenth adder;
wherein said first programmable read-only memory receives output signals from said tenth adder;
wherein a sixth register receives output signals from said first programmable read-only memory and from said counter;
wherein said twenty-second adder receives output signals from said sixth register and from a seventh register;
wherein a seventh inverter receives output signals from said twenty-second adder; and
wherein a twenty-third adder receives a constant and receives output signals from said sixteenth adder and said seventh inverter, the output of said twenty-third adder being frequency components $A_{3I}$, $A_{5R}$;
wherein said eleventh adder selectively receives the real and imaginary components of said samples $a_3$, $a_5$;
wherein an eighth inverter receives output signals from said eleventh adder;
wherein a twelfth adder receives a constant and receives output signals from said seventh adder and said eighth inverter;
wherein said second programmable read-only memory receives output signals from said twelfth adder;
wherein said seventh register receives output signals from said second programmable read-only memory;
wherein said twenty-fourth adder receives a constant and receives output signals from said seventh register and from a thirteenth inverter, said thirteenth inverter receiving output signals from said sixth register;
wherein a ninth inverter receives output signals from said twenty-fourth adder; and
wherein a twenty-fifth adder receives a constant and receives output signals from said nineteenth adder and said ninth inverter, the output of said twenty-fifth adder being frequency components $A_{5I}$, $A_{3R}$;
wherein a tenth inverter selectively receives the real and imaginary components of said samples $a_5$;
wherein said thirteenth adder selectively receives the real and imaginary components of said sample $a_3$, receives a constant and receives output signals from said tenth inverter;
wherein an eleventh inverter receives output signals from said thirteenth adder;
wherein a fourteenth adder receives a constant and receives output signals from said ninth adder and said eleventh inverter;
wherein said eighth register receives output signals from said fourteenth adder;
wherein a twelfth inverter receives output signals from said eighth register; and wherein a twenty-sixth adder receives a constant and receives output signals from said third register and from said twelfth inverter, the output of said twenty-sixth adder being frequency components $A_{2I}$, $A_{6R}$.

50. A method for processing a time domain signal to determine the frequency content thereof, comprising the steps of:
(a) quantizing the time domain signal to produce N discrete input data samples $a_n (n=0,1,2,\ldots,N-1)$ having real components $a_{nR}$ and imaginary components $a_{nI}$ such that $N=L_1 \cdot L_2 \cdot L_3$ where $L_1$, $L_2$ and $L_3$ are relatively prime numbers;
(b) storing said discrete samples in a first data memory stage and retrieving said stored samples in a first predetermined order in which component positions are circularly rotated by a predetermined number of positions from the order of storage thereof;
(c) receiving the retrieved samples in said first predetermined order in an $L_1$-point computational stage and calculating real and imaginary output signal representing the solution to an $L_1$-point Discrete Fourier Transform;
(d) storing the real and imaginary output signals of the $L_1$-point computational stage in a second data memory stage and retrieving said stored signals in a second predetermined order in which component positions are circularly rotated by a predetermined number of positions from the order of storage thereof;
(e) receiving the retrieved signals in said second predetermined order in an $L_2$-point computational stage and calculating real and imaginary output signals representing the solution to an $L_1 \cdot L_2$-point Discrete Fourier Transform;
(f) storing the real and imaginary output signals of the $L_2$-point computational stage in a third data memory stage and retrieving said stored signals;
(g) receiving the retrieved signals from said third data memory stage in an $L_3$-point computational stage and calculating real and imaginary output signals representing the solution to an $L_1 \cdot L_2 \cdot L_3$-point Discrete Fourier Transform; and
(h) storing the real and imaginary output signals of the $L_3$-point computational stage in a fourth data memory stage.

51. The method of claim 50:
wherein the step (b) includes storing the real components of said samples in a real part of said first data memory stage and storing the imaginary components of said samples in an imaginary part of said first data memory stage;
wherein the step (d) includes storing the real output signals in a real part of said second data memory stage and storing the imaginary output signals in an imaginary part of said second data memory stage;
wherein the step (f) includes storing the real output signals in a real part of said third data memory stage and storing the imaginary output signals in an imaginary part of said third data memory stage; and
wherein the step (h) includes storing the real output signals in a real part of said fourth data memory stage and storing the imaginary output signals in an imaginary part of said fourth data memory stage.

52. The method of claim 51 wherein each of said real and imaginary parts of each of said data memory stages includes a first half and a second half;
wherein each of the steps (b), (d) and (f) include reading real data into one of said first and second halves of said real part while writing real data out of the other of said first and second halves of said real part; and
wherein each of the steps (b), (d) and (f) include reading imaginary data into one of said first and second halves of said imaginary part while writing imaginary data out of the other of said first and second halves of said imaginary part.

53. The method of claim 50 wherein each of the steps (b), (d) and (f) include selectively addressing a plurality of random access memories.

54. The method of claim 50:
wherein the step (a) includes quantizing the time domain signal to produce 120 discrete input data samples $a_n$, $n=0,1,2,\ldots,119$, and further wherein $L_1=8$, $L_2=5$, $L_3=3$;
wherein the step (b) includes circularly rotating data sequence $a_{15m+i}$ ($m=0,1,2,\ldots,7$) by i positions, $i=0,1,2,\ldots 14$;
wherein the step (c) includes performing an 8-point computation on each of the rotated sequences $i=0,1,2,\ldots,14$;
wherein the step (d) includes circularly rotating data sequence $G_{3v+j}^{(s)}$ ($v=0,1,2,3,4$) by 3j positions, $j=0,1,2$ for each $s=0,1,2,\ldots,7$;
wherein the step (e) includes performing a 5-point computation on each of the rotated sequences $j=0,1,2$ for each $s=0,1,2,\ldots,7$;
wherein the step (f) includes retrieving the stored signals in data sequence $H_j^{(p,s)}$ ($j=0,1,2$), $p=0,1,2,3,4$; $s=0,1,2,\ldots,7$; and
wherein the step (g) includes performing a 3-point computation on each of the sequences $H_j^{(p,s)}$, $p=0,1,2,3,4$ for each $s=0,1,2,\ldots,7$.

* * * * *